(12) United States Patent
Fukui

(10) Patent No.: US 7,650,532 B2
(45) Date of Patent: Jan. 19, 2010

(54) STORAGE SYSTEM

(75) Inventor: Katsuhiko Fukui, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 773 days.

(21) Appl. No.: 10/998,758

(22) Filed: Nov. 30, 2004

(65) Prior Publication Data
US 2006/0075292 A1 Apr. 6, 2006

(30) Foreign Application Priority Data
Oct. 5, 2004 (JP) .............................. 2004-292170

(51) Int. Cl.
G06F 11/00 (2006.01)
(52) U.S. Cl. ............................... 714/6; 714/25; 714/47; 714/48; 714/51; 709/203; 709/224
(58) Field of Classification Search ...................... 714/4, 714/8, 25, 47, 48, 51; 709/203
See application file for complete search history.

(56) References Cited

U.S. PATENT DOCUMENTS

| | | | | |
|---|---|---|---|---|
| 5,764,878 | A * | 6/1998 | Kablanian et al. ............... | 714/7 |
| 5,764,913 | A * | 6/1998 | Jancke et al. ................. | 709/224 |
| 5,961,597 | A * | 10/1999 | Sapir et al. ................... | 709/224 |
| 6,112,273 | A * | 8/2000 | Kau et al. ..................... | 710/260 |
| 6,393,386 | B1 * | 5/2002 | Zager et al. .................... | 703/25 |
| 7,275,103 | B1 * | 9/2007 | Thrasher et al. .............. | 709/224 |
| 2002/0049845 | A1 * | 4/2002 | Sreenivasan et al. ......... | 709/226 |
| 2006/0075292 | A1 * | 4/2006 | Fukui ............................ | 714/9 |

FOREIGN PATENT DOCUMENTS

| | | |
|---|---|---|
| JP | 06-083657 | 3/1994 |
| JP | 2000-353154 | 12/2000 |
| JP | 2001-22712 | 1/2001 |

OTHER PUBLICATIONS

IBM "Tivoli Storage Managment", Oct. 2000.*
IBM, Tivoli Storage Area Network Manager, Sep. 2003.*
IBM,"Tivoli Storage Network Manager", 2001, pp. 1-4.*
Praveen, "A scalable Distributed Information Management System" Aug. 2004, p. 379-390.*

* cited by examiner

*Primary Examiner*—Robert Beausolel
*Assistant Examiner*—Jeison C Arcos
(74) *Attorney, Agent, or Firm*—Antonelli, Terry, Stout & Kraus, LLP.

(57) ABSTRACT

In addition to setting tasks and maintenance tasks for each portion of a storage apparatus, for which ease of operation is demanded, a storage system enables notification of a monitoring and maintenance terminal, for which high reliability is demanded, of fault information, without detracting from reliability. The functions of a SVP 23 and SVP 25 are functions to monitor the storage apparatus 3, and functions for notification to a remote maintenance center terminal 13 or similar, for which high reliability is demanded. The notification function involves notification to a remote maintenance center terminal 3 or similar of a fault or other event in the storage apparatus 3, detected by the monitoring function. The functions of the SVP 23 and SVP 25 are limited to functions for notification of faults in the storage apparatus 3, notification of information other than faults, and SNMP functions, so that the volume of the OS and other programs installed on the SVP 23 and SVP 25 is reduced.

2 Claims, 16 Drawing Sheets

FIG. 4

SVP FUNCTIONS

| CATEGORY | MAIN FUNCTIONS | OPERATIONS TERMINAL | | | |
|---|---|---|---|---|---|
| | | SVP | MAINTENANCE PC | MAINTENANCE CENTER TERMINAL | CLIENT TERMINAL |
| DEVICE SETTINGS | CONFIGURATION INFORMATION SETTINGS | | ◎ | | |
| | INITIAL SETTINGS | | ◎ | | |
| MAINTENANCE TASKS | APPARATUS STATE DISPLAY | | ◎ | | |
| | FAULT LOG INFORMATION DISPLAY | | ◎ | | |
| | THRESHOLD SETTING/ MODIFICATION | | ◎ | | |
| | PART REPLACEMENT | | ◎ | | |
| | MICROPROGRAM REPLACEMENT | | ◎ | | |
| | DATA DUMP | | ◎ | | |
| MONITORING AND REMOTE MAINTENANCE | FAULT NOTIFICATION | O | | ◎ | |
| | INFORMATION ACQUISITION | O | | ◎ | |
| CLIENT OPERATIONS | SNMP NOTIFICATION | O | | | ◎ |

◎: OPERATIONS TERMINAL   O: FUNCTION PROVIDED

FUNCTIONS OF MAINTENANCE PC: MAINTENANCE PC, MAINTENANCE CENTER TERMINAL

FUNCTIONS OF SVP: CLIENT TERMINAL

MANAGEMENT TABLE
SVP1

| COMMUNICATION PATH | 1-1 | 1-2 | 1-3 |
|---|---|---|---|
| COMMUNICATION RESULT | 1 | 1 | 1 |

SVP2

| COMMUNICATION PATH | 2-1 | 2-2 | 2-3 |
|---|---|---|---|
| COMMUNICATION RESULT | 0 | 0 | 0 |

COMMUNICATION RESULTS:
1 = SUCCESS
0 = FAILURE

FIG. 9A

JUDGMENT OF FAULTS USING MANAGEMENT TABLE INFORMATION

| SVP1 | MANAGEMENT TABLE VALUE | | | | | | COUNTERMEASURE | NOTES |
|---|---|---|---|---|---|---|---|---|
| | 1-1 | 1-2 | 1-3 | 2-1 | 2-2 | 2-3 | | |
| | 1 | 1 | 0 | 0 | 0 | 1 | NONE | NORMAL OPERATION |
| | 1 | 1 | 0 | 0 | 0 | 0 | JUDGMENT OF HUB1 MALFUNCTION, SWITCHING HUB1 → HUB2, NOTIFICATION OF HUB1 MALFUNCTION | |
| | 1 | 0 | 0 | 0 | 0 | 1 | JUDGMENT OF HUB1 MALFUNCTION, SWITCHING HUB1 → HUB2, NOTIFICATION OF HUB1 MALFUNCTION | |
| | 1 | 0 | 0 | 0 | 0 | 0 | JUDGMENT OF HUB1 MALFUNCTION, SWITCHING HUB1 → HUB2, NOTIFICATION OF HUB1 MALFUNCTION | |
| | 0 | 1 | 0 | 0 | - | - | MALFUNCTION LOCATION CANNOT BE IDENTIFIED. SWITCHING HUB1 → HUB2, JUDGE USING RESULTS OF A BELOW | |
| | 0 | 0 | 0 | 0 | - | - | MALFUNCTION LOCATION CANNOT BE IDENTIFIED. SWITCHING HUB1 → HUB2, JUDGE USING RESULTS OF B BELOW | |

| SVP2 | MANAGEMENT TABLE VALUE | | | | | | COUNTERMEASURE | NOTES |
|---|---|---|---|---|---|---|---|---|
| | 2-1 | 2-2 | 2-3 | 1-1 | 1-2 | 1-3 | | |
| | 0 | 0 | 1 | 1 | 1 | 0 | NONE | NORMAL OPERATION |
| | 0 | 0 | 0 | 1 | 1 | 0 | JUDGMENT OF HUB1 MALFUNCTION, SWITCHING HUB1 → HUB2, NOTIFICATION OF HUB1 MALFUNCTION | |
| | 0 | 0 | 1 | 1 | 0 | 0 | JUDGMENT OF HUB1 MALFUNCTION, SWITCHING HUB1 → HUB2, NOTIFICATION OF HUB1 MALFUNCTION | |
| | 0 | 0 | 0 | 1 | 0 | 0 | JUDGMENT OF HUB1 MALFUNCTION, SWITCHING HUB1 → HUB2, NOTIFICATION OF HUB1 MALFUNCTION | |
| | 0 | 0 | 1 | 0 | - | - | MALFUNCTION LOCATION CANNOT BE IDENTIFIED. SWITCHING HUB1 → HUB2, JUDGE USING RESULTS OF A BELOW | |
| | 0 | 0 | 0 | 0 | - | - | MALFUNCTION LOCATION CANNOT BE IDENTIFIED. SWITCHING HUB1 → HUB2, JUDGE USING RESULTS OF B BELOW | |

1: COMMUNICATION SUCCESS FLAG
0: COMMUNICATION FAILURE FLAG
-: NO INFORMATION

FIG. 9B

JUDGMENT OF FAULTS USING MANAGEMENT TABLE INFORMATION

| SVP1 | MANAGEMENT TABLE VALUE | | | | | | | COUNTERMEASURE | NOTES |
|---|---|---|---|---|---|---|---|---|---|
| | 1-1 | 1-2 | 1-3 | 2-1 | 2-2 | 2-3 | | | |
| | 0 | 0 | 1 | 1 | 1 | 0 | | JUDGMENT OF HUB1 MALFUNCTION, NOTIFICATION OF HUB1 MALFUNCTION | |
| | 0 | 0 | 1 | 1 | 0 | 0 | | JUDGMENT OF HUB1 MALFUNCTION + HUB2-SVP2 LAN MALFUNCTION, NOTIFICATION OF HUB1 MALFUNCTION | |
| | 0 | 0 | 0 | 1 | 1 | 0 | | JUDGMENT OF HUB1 MALFUNCTION, NOTIFICATION OF HUB1 MALFUNCTION | |
| | 0 | 0 | 0 | 1 | 0 | 0 | | JUDGMENT OF HUB1/2 DUAL MALFUNCTION OR MP-SIDE MALFUNCTION, NOTIFICATION OF MALFUNCTION | |
| | 0 | 0 | 1 | 0 | - | - | | JUDGMENT OF SVP2 MALFUNCTION, SWITCHING HUB2 → HUB1, SVP2 MALFUNCTION NOTIFICATION | |
| | 0 | 0 | 0 | 0 | - | - | | JUDGMENT OF SVP2 MALFUNCTION OR HUB1/2 DUAL MALFUNCTION, SWITCHING HUB2 → HUB1, NOTIFICATION OF MALFUNCTION | |

| SVP2 | MANAGEMENT TABLE VALUE | | | | | | | COUNTERMEASURE | NOTES |
|---|---|---|---|---|---|---|---|---|---|
| | 2-1 | 2-2 | 2-3 | 1-1 | 1-2 | 1-3 | | | |
| | 1 | 1 | 0 | 0 | 0 | 1 | | JUDGMENT OF HUB1 MALFUNCTION, NOTIFICATION OF HUB1 MALFUNCTION | |
| | 1 | 0 | 0 | 0 | 0 | 1 | | JUDGMENT OF HUB1 MALFUNCTION + HUB2-SVP2 LAN MALFUNCTION, NOTIFICATION OF HUB1 MALFUNCTION | |
| | 1 | 1 | 0 | 0 | 0 | 0 | | JUDGMENT OF HUB1 MALFUNCTION, NOTIFICATION OF HUB1 MALFUNCTION | |
| | 1 | 0 | 0 | 0 | 0 | 0 | | JUDGMENT OF HUB1/2 DUAL MALFUNCTION OR MP-SIDE MALFUNCTION, NOTIFICATION OF MALFUNCTION | |
| | 0 | 1 | 0 | 0 | - | - | | HUB2 → HUB1 SWITCHING | SVP1 GIVEN PRIORITY IN FAULT LOCATION JUDGMENT |
| | 0 | 0 | 0 | 0 | - | - | | HUB2 → HUB1 SWITCHING | SVP1 GIVEN PRIORITY IN FAULT LOCATION JUDGMENT |

1: COMMUNICATION SUCCESS FLAG
0: COMMUNICATION FAILURE FLAG
-: NO INFORMATION

FIG. 9C

JUDGMENT OF FAULTS USING MANAGEMENT TABLE INFORMATION

| SVP1 | MANAGEMENT TABLE VALUE | | | | | | COUNTERMEASURE | NOTES |
|---|---|---|---|---|---|---|---|---|
| | 1-1 | 1-2 | 1-3 | 2-1 | 2-2 | 2-3 | | |
| | 0 | 0 | 1 | 1 | 1 | 0 | JUDGMENT OF HUB1 MALFUNCTION, NOTIFICATION OF HUB1 MALFUNCTION | |
| | 0 | 0 | 1 | 1 | 0 | 0 | JUDGMENT OF HUB1 MALFUNCTION + HUB2-SVP2 LAN MALFUNCTION, NOTIFICATION OF HUB1 MALFUNCTION | |
| | 0 | 0 | 0 | 1 | 1 | 0 | JUDGMENT OF HUB1 MALFUNCTION, NOTIFICATION OF HUB1 MALFUNCTION | |
| | 0 | 0 | 0 | 1 | 0 | 0 | JUDGMENT OF HUB1/2 DUAL MALFUNCTION OR MP-SIDE MALFUNCTION, NOTIFICATION OF MALFUNCTION | |
| | 0 | 0 | 1 | 0 | 0 | - | JUDGMENT OF SVP2 MALFUNCTION, HUB2 → HUB1 SWITCHING, NOTIFICATION OF SVP2 MALFUNCTION | |
| | 0 | 0 | 0 | 0 | - | - | JUDGMENT OF SVP1 MALFUNCTION, SVP1 → SVP2 SWITCHING, HUB2 → HUB1 SWITCHING, NOTIFICATION OF SVP1 MALFUNCTION | |

| SVP2 | MANAGEMENT TABLE VALUE | | | | | | COUNTERMEASURE | NOTES |
|---|---|---|---|---|---|---|---|---|
| | 2-1 | 2-2 | 2-3 | 1-1 | 1-2 | 1-3 | | |
| | 1 | 1 | 0 | 0 | 0 | 1 | NOTIFICATION OF HUB1 MALFUNCTION | |
| | 1 | 0 | 0 | 0 | 0 | 1 | NOTIFICATION OF HUB1 MALFUNCTION + HUB2-SVP2 LAN MALFUNCTION | |
| | 1 | 1 | 0 | 0 | 0 | 0 | NOTIFICATION OF HUB1 MALFUNCTION | |
| | 1 | 0 | 0 | 0 | 0 | 0 | NOTIFICATION OF HUB1/2 DUAL MALFUNCTION OR MP-SIDE MALFUNCTION | |
| | 0 | 1 | 0 | 0 | - | - | JUDGMENT OF SVP1 MALFUNCTION, SVP1 → SVP2 SWITCHING, HUB2 → HUB1 SWITCHING, NOTIFICATION OF SVP1 MALFUNCTION | SVP1 GIVEN PRIORITY IN FAULT LOCATION JUDGMENT |
| | 0 | 0 | 0 | 0 | - | - | HUB2 → HUB1 SWITCHING | |

1: COMMUNICATION SUCCESS FLAG
0: COMMUNICATION FAILURE FLAG
-: NO INFORMATION

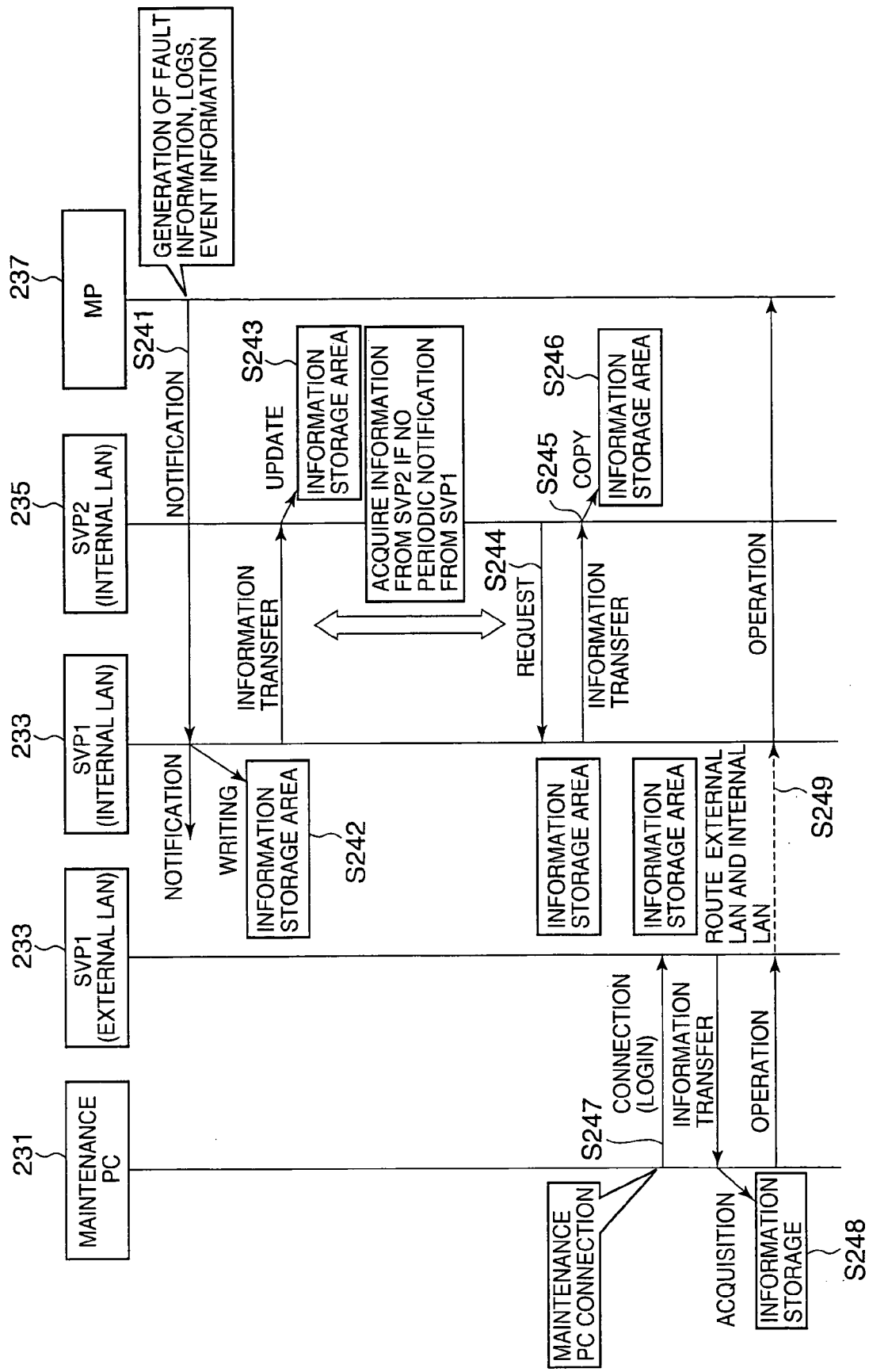

STORAGE APPARATUS

SVP

STORAGE APPARATUS

SVP

STORAGE SYSTEM

CROSS-REFERENCE TO PRIOR APPLICATION

This application relates to and claims priority from Japanese Patent Application No. 2004-292170, filed on Oct. 5, 2004, the entire disclosure of which is incorporated herein by reference.

BACKGROUND OF THE INVENTION

1. Field of the Invention

This invention relates to an information processing system comprising a storage apparatus connected to a higher-level device or to another storage apparatus to enable communication.

2. Description of the Related Art

In the prior art, fault monitoring systems have been proposed with the object of accurately ascertaining faults occurring within a large-scale computer system, in time series order of occurrence. Such a fault monitoring system comprises a plurality of nodes, which are mutually independent computers; a crossbar data switch which switches signal paths between nodes; a crossbar control device which controls driving of the crossbar data switch; a slave service processor, connected to nodes, the crossbar data switch, and the crossbar control device, which monitors faults and upon detection of a fault immediately outputs prescribed fault information; and a master service processor which, by receiving fault information, monitors faults in time series order of occurrence (see for example Japanese Patent Laid-open No. 2000-353154).

Further, a service processor switching method has been proposed, with the object of rapidly and reliably performing switching processing upon the occurrence of faults in a plurality of service processors, while enabling continuous operation of the electronic computer system. This service processor switching method is applied to an electronic computer system comprising an electronic computer main unit and a plurality of service processors; by storing, in a configuration information storage area provided within the main storage apparatus of the electronic computer main unit, configuration information for the electronic computer main unit which is referenced during operation to perform monitoring and control of the electronic computer main unit and to exchange information with operators, common access from a plurality of service processors is made possible, and upon occurrence of a master or service processor fault, a backup service processor reads the configuration information and executes continuous operation of the electronic computer system (see for example Japanese Patent Laid-open No. 6-83657).

Further, an information processing device initialization setting method has been proposed with the object of shortening the initialization setting time of an information processing device in which a SVP (service processor), adopting a dual-redundant hot-standby configuration, performs initialization settings. In this proposed method, a single computer system is configured from a plurality of systems of arithmetic units, and two SVPs adopt a hot-standby design. The two initialization setting execution means comprise a two-SVP initialization setting procedure in which two SVPs perform initialization setting in parallel, and a one-SVP initialization setting procedure in which one SVP performs all initialization settings; at the start of initialization settings, two connection switching means for two access paths between each of the SVPs and arithmetic units are both in the connected state, and the two SVPs use the two-SVP initialization setting procedure to perform initialization setting in parallel. If, during the period until completion of initialization setting, two fault monitoring means detect a fault in the other-system SVP, the two connection switching means are employed to separate the two access paths connected to the other-system SVP, and one SVP uses the one-SVP initialization setting procedure to perform all initialization setting (see for example Japanese Patent Laid-open No. 2001-22712).

However, in a storage apparatus of the prior art, an SVP comprises the functions of a terminal for maintenance operations which performs equipment settings to make various settings (environment settings and similar) and maintenance operations for the various portions of the storage apparatus which is the object of operations, and functions such as acquisition of fault information relating to the storage apparatus, notification of a maintenance center terminal in a remote location of the acquired fault information, and SNMP (Simple Network Management Protocol) notification of a client terminal. In order to performs the functions of a maintenance operations terminal, the SVP must afford ease of operation in device setting and maintenance tasks; for example, a commercial OS (Operating System) having a GUI (Graphical User Interface) is employed. On the other hand, in order for the SVP to perform functions for notification to a remote maintenance center terminal of fault information and for SNMP notification of client terminals, the operating states of each portion of a storage apparatus to be monitored must be monitored constantly, and when a fault or other event occurs in a portion of the storage apparatus, information on the event must be reliably sent to the remote maintenance center terminal, client terminal or similar, so that high reliability is required.

However, if an attempt is made to perform monitoring and notification operations with the high degree of reliability required using the same hardware as the SVP, which functions as a maintenance operations terminal to make device settings and perform maintenance operations, and for which ease of operation is demanded, then an application program to perform the above-described monitoring and notification tasks must run on the above-described commercial OS, so that degradation of the reliability of the monitoring and notification tasks becomes a problem.

SUMMARY OF THE INVENTION

Hence in a storage system, in addition to tasks, in which ease of operation is required, to make settings and perform maintenance for each of the portions of the storage apparatus, an object of the invention is to enable fault information notification of monitoring and maintenance terminals, for which high reliability is demanded, without causing any decline in reliability.

A storage system according to a first perspective of the invention comprises a storage apparatus which performs communication over a communication network with a terminal for monitoring and maintenance; a first information processing terminal to perform the necessary tasks to make settings and to perform maintenance and management of each portion of the above storage apparatus; and a second information processing terminal which monitors the state of each of the portions of the above storage apparatus, and when occurrence of an event in the above storage apparatus is recognized, notifies the above monitoring and maintenance terminal of the event occurrence.

In a preferred aspect of the first perspective of this invention, the above storage apparatus performs communication also with a user terminal over a communication network.

In another aspect different from the above, notification from the above second information processing terminal comprises SNMP notification to a user terminal.

In another aspect different from the above, the above second information processing terminal comprises, as a storage unit, a storage unit other than magnetic recording media.

In another aspect different from the above, an OS having a GUI is installed in the above first information processing terminal, and the above first information processing terminal performs communication, via the above second information processing terminal, with an information processing portion which controls a storage unit within the storage apparatus, and executes processing necessary for storage apparatus maintenance and management.

A storage system according to a second perspective of the invention comprises a storage apparatus which performs communication over a communication network with a terminal for monitoring and maintenance; a first information processing terminal to perform the necessary tasks to make settings and to perform maintenance and management of each portion of the above storage apparatus; and a second information processing terminal which monitors the state of each of the portions of the above storage apparatus, and when occurrence of an event in the above storage apparatus is recognized, notifies the above monitoring and maintenance terminal of the event occurrence; wherein the above second information processing terminal comprises at least two information processing terminals, one an information processing terminal in the operating state, and another an information processing terminal in the standby state; each of the above second information processing terminals comprises a state monitoring portion which monitors the state of the other information processing terminal by means of mutual communication; and, when the state monitoring portion of the above second information processing terminal in the standby state judges that an anomaly has occurred in the state of the above second information processing terminal in the operating state, operation of the above second information processing terminal in the operating state is halted, and the above second information processing terminal in the standby state is caused to operate.

In a preferred aspect of the second perspective of the invention, the communication path between the above two information processing terminals and the information processing portion controlling the storage unit within the above storage apparatus is made dual-redundant.

In another aspect different from the above, after either of the above state monitoring portions has communicated with the state monitoring portion of the second information processing terminal which is the other terminal, if there has been no response from the state monitoring portion of the second information processing terminal which is the other terminal even after a fixed time has elapsed, the state of the second information processing terminal which is the other terminal is judged to be anomalous.

In another aspect different from the above, each of the above second information processing terminals has a management table in which is recorded information indicating the results of communication tests with the second information processing terminal which is the other terminal.

In another aspect different from the above, the above communication tests are performed for a plurality of different communication paths connecting both of the above second information processing terminals together.

In another aspect different from the above, each of the above second information processing terminals has pattern information to detect whether a malfunction has occurred in the other second information processing terminal and to detect the malfunction location, obtained as a result of communication tests performed with the second information processing terminal that is the other terminal.

In another aspect different from the above, each of the above state monitoring portions references information recorded in the above management table and the above pattern information to judge whether the second information processing terminal which is the other terminal is in an anomalous state.

In another aspect different from the above, upon judging the second information processing terminal which is the other terminal to be in an anomalous state, each of the above state monitoring portions turns off the power to each of the portions of the second information processing terminal which is the other terminal from the driving power supply of the second information processing terminal which is the other terminal, to halt operation of the second information processing terminal which is the other terminal.

In another aspect different from the above, the above second information processing terminal in the operating state, by performing communication with the information processing portion which controls the storage unit in the above storage apparatus, performs communication with the above second information terminal in the standby state, with the timing with which information relating to the above storage apparatus, stored in the information storage portion of the above second information processing terminal in the operating state, is updated.

In another aspect different from the above, the above second information processing terminal in the standby state updates information relating to the above storage apparatus, stored in the information storage portion of the above second information processing terminal in the standby state, with the timing with which communication is performed with the above second information processing terminal in the operating state.

In another aspect different from the above, the above first information processing terminal is either a mobile terminal, or is a desktop-type stationary terminal.

A storage system according to a third perspective of the invention comprises a storage apparatus main unit, and a plurality of HDD boxes housing a plurality of HDDs, a logic box housing a plurality of logic boards, a power supply device, and a service processor, all housed within the above storage apparatus main unit; the above service processor is miniaturized, and is mounted on a standard logic board in the above logic box.

BRIEF DESCRIPTION OF THE DRAWINGS

FIG. 4 is an explanatory drawing showing a list of the respective functions of the first SVP (or second SVP), maintenance PC, client terminal, and remote maintenance center terminal shown in FIG. 1;

FIG. 9 is an explanatory drawing showing results of malfunction judgments for the first SVP and second SVP performed by a monitoring application based on the management table information of FIG. 8, and correspondence based on the judgment results;

FIG. 11 is a flowchart showing a procedure for data communication performed among the various portions of the information processing system comprising a storage apparatus of a third aspect of the invention;

DESCRIPTION OF THE PREFERRED EMBODIMENTS

Below, aspects of the invention are explained in detail using the drawings.

Figure 1:
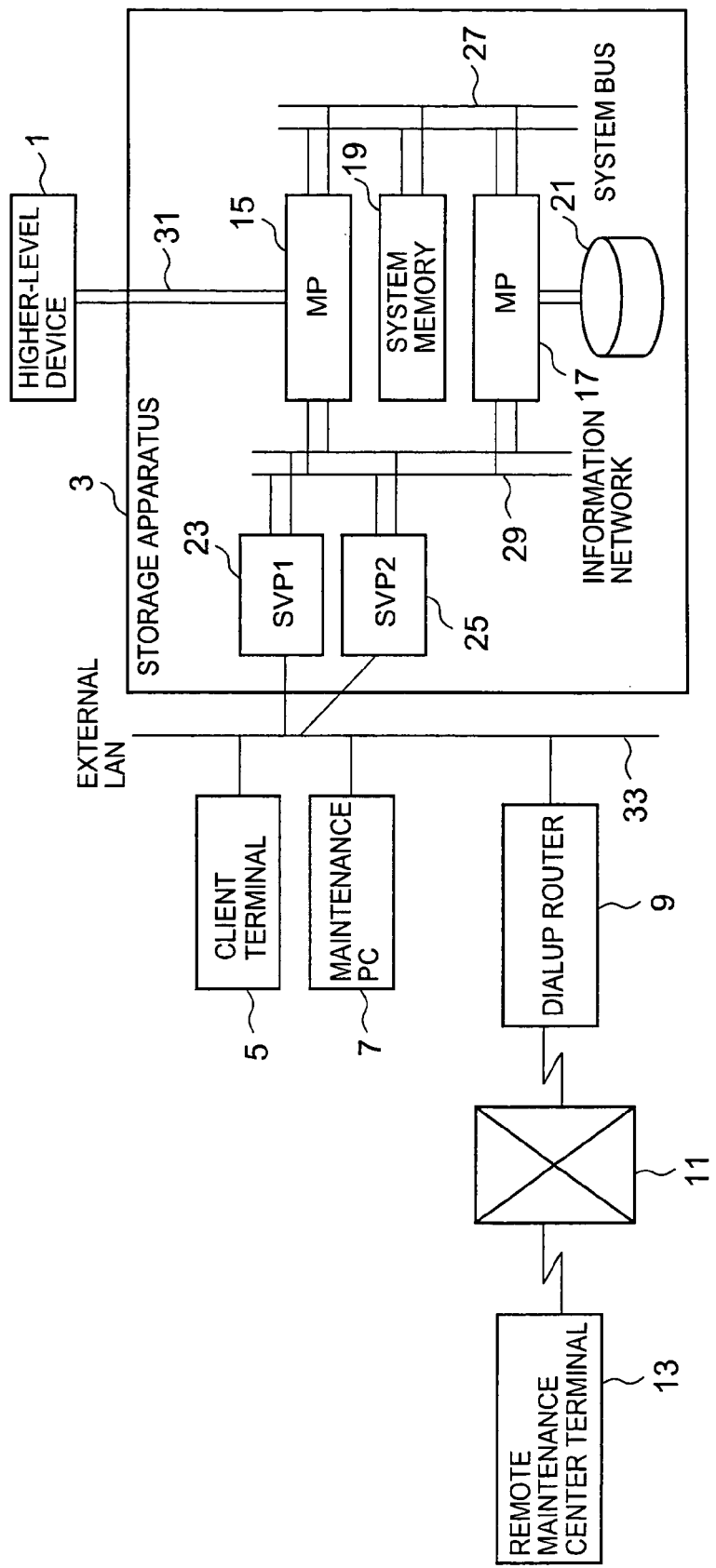
FIG. 1 is a block diagram showing the overall configuration of an information processing system comprising a storage apparatus of a first aspect of the invention.

FIG. 1 is a block diagram showing the overall configuration of an information processing system comprising a storage apparatus of a first aspect of the invention.

As shown in FIG. 1, the above information processing system comprises a higher-level device 1, storage apparatus 3, client terminal 5, maintenance PC 7, dialup router 9, public telephone circuit network 11, and remote maintenance center terminal 13. The storage apparatus 3 comprises a plurality of MPs (microprocessors) 15, 17 (for convenience in the drawing and explanation, in FIG. 1 only two are shown, assigned the symbols 15 and 17), and system memory (SM (shared memory) in which is stored, for example, system configuration information required for operation and for maintenance and management of the information processing system, operation management information, and similar) 19. In addition to the above portions, the storage apparatus 3 comprises a plurality of storage units 21 (for convenience in the drawing and explanation, in FIG. 1 only one is shown, assigned the symbol 21), a first SVP 23, a second SVP 25, and CM (cache memory). Also, within the storage apparatus 3 are installed a system bus 27 and information network 29.

The higher-level device 1 is a computer device comprising a CPU (Central Processing Unit), memory, and other information processing resources. The higher-level device 1 exchanges data (performs data communication) with the storage apparatus 3 via a prescribed communication network 31.

In the storage apparatus 3, the MP 15 is incorporated into a CHA (channel adapter) to perform data communication with, for example, the higher-level device 1. On the other hand, the MP 17 is incorporated into a DKA (disk adapter) to exchange data with, for example, the storage unit 21. The MP 15 and MP 17 perform communication via for example the system bus 27 and SM (system memory 19), or via the system bus 27.

A microprocessor program causing the MP 15 and MP 17 to execute prescribed processing operation is installed in the MP 15 and MP 17.

Upon receiving a READ request from the higher-level device 1 via the communication network 31, the MP 15 reads, via the system bus 27, data corresponding to the above READ request which is temporarily held in a prescribed storage area of the above CM. The read-out data is then transferred to the higher-level device 1 via the communication network 31. Upon receiving a WRITE request from the higher-level device 1 via the communication network 31, the MP 15 writes the data transferred from the higher-level device 1 via the communication network 31 to a prescribed storage area of the above CM, via the system bus 27, according to the WRITE request. This data is temporarily held in the above CM.

Based on notification from the MP 15, the MP 17 reads data corresponding to the READ request from the higher-level device 1 from the storage unit 21 via the system bus 27, and writes the data thus read to a prescribed storage area of the above CM. Based on the notification from the MP 15, the MP 17 writes the data written to the prescribed storage area of the above CM due to the WRITE request from the higher-level device 1 to the storage unit via the system bus 27. By this means, the data is stored in the storage unit 21.

The first SVP 23 and second SVP 25 comprise the same circuit configuration, and adopt a PC (personal computer) having the same functions. In this aspect, the circuit configuration of the first SVP 23 and second SVP 25 exclude a HDD (hard disk drive), FDD (floppy disk drive), CD (compact disc)-ROM, and other devices having comparatively high malfunction rates. Details of the circuit configuration comprised by the first SVP 23 and second SVP 25 are described below.

On the other hand, the functions of the first SVP 23 and second SVP 25, all of which must have high reliability, are a function for monitoring the storage apparatus 3, and a function for notifying the remote maintenance center terminal 13 and client terminal 5. The function for notification of the remote maintenance center terminal 13 and client terminal 5 entails notifying the remote maintenance center terminal 13 and client terminal 5 of faults and other events occurring in the storage apparatus 3, which have been detected by the monitoring function. In this aspect, the functions of the first SVP 23 and second SVP 25 are limited to, for example, functions for notification of faults occurring in the storage apparatus 3, functions for notification of information not relating to faults, and SNMP functions, in order to reduce the volume of the OS and other programs installed on the first SVP 23 and second SVP 25.

The first SVP 23 (or second SVP 25), in addition to communicating with the MP 15 and MP 17 via the information network 29, also communicates with the client terminal 5 and maintenance PC 7 via the external LAN 33.

In this aspect, the maintenance PC 7 adopts the same circuit configuration as that of the first SVP 23 and second SVP 25, and moreover a commercial OS (Operating System) with for example a GUI (Graphical User Interface) is installed. On the OS is installed a dedicated application program, so that the maintenance PC 7 functions as an operations terminal, for which ease of operation is demanded, to make various settings in the storage apparatus 3 and perform maintenance tasks and similar on the storage apparatus 3. The maintenance PC 7, by starting the above dedicated application program, exchanges data with the MP 15 or MP 17 via an external LAN 33 and the first SVP 23 (or second SVP 25), and makes settings necessary for maintenance and management of the storage apparatus 3.

The dialup router 9 is a router comprising dialup connection functions as well as receiving functions, and can also function as a connection server for dialup connection requests from external equipment.

The remote maintenance center terminal 13 exchanges data with the MP 15 or MP 17 via the public telephone circuit network 11, dialup router 9, external LAN 33, and first SVP 23 (or second SVP 25), to acquire from the MP 15 or MP 17 data necessary for maintenance and management of the storage apparatus 3 from a remote location.

Figure 2:
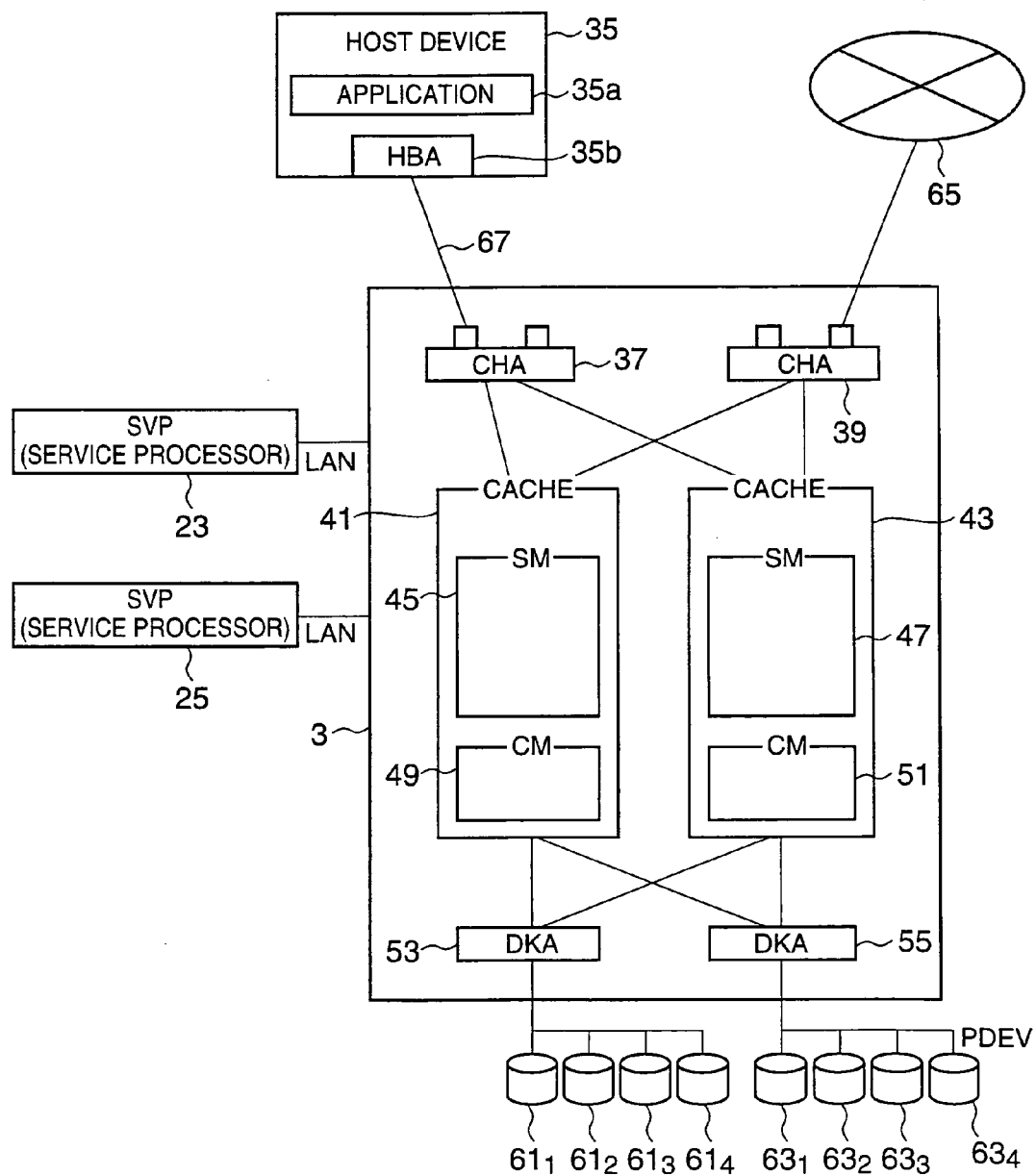
FIG. 2 is a block diagram showing the overall configuration of the storage apparatus in FIG. 1.

FIG. 2 is a block diagram showing the overall configuration of the storage apparatus in FIG. 1.

In FIG. 2, the host device 35 corresponds to the higher-level device 1 shown in FIG. 1, and is a computer device comprising a CPU, memory, and other information processing resources. The host device 35 has, for example, a keyboard, pointing device, microphone, and other information input means (not shown), as well as a monitor display, speaker, and other information output means (not shown). The host device 35 also has, for example, an application program 35a such as database software to use the storage area provided by the storage apparatus 3, and an adapter 35b to access the storage apparatus 3 via a communication network 67.

As the communication network 67, for example, a LAN (Local Area Network), SAN (Storage Area Network), the Internet, dedicated circuits, public circuits, or similar can be used selectively according to circumstances. Here, data communication over a LAN is performed according to, for example the TCP/IP (Transmission Control Protocol/Internet Protocol) protocol. When the host device 35 is connected to the storage apparatus 3 via a LAN, the host device 35 requests data input/output in file units, specifying a filename. On the other hand, when the host device 35 connects to the storage apparatus 3 or similar via a SAN, the host device 35 requests data input/output in block units, which are the data management units of the storage area provided by a plurality of disk storage devices (disk drives), according to the fiber channel protocol. When the communication network 67 is a LAN, the above adapter 35b is for example a LAN-compatible network card. When the communication network 67 is a SAN, the above adapter 35b is for example a host bus adapter (HBA).

The storage apparatus 3 is, for example, configured as a disk array subsystem. However, the storage apparatus 3 is not limited to this, and can be configured as an intelligent fiber channel switch with enhanced functionality. The storage apparatus 3 can be broadly divided into a controller portion and a storage device portion. The controller portion comprises, for example, a plurality of CHAs 37, 39 (in FIG. 2, only two are shown), and a plurality of disk adapters (DKAs) 53, 55 (in FIG. 2, only two are shown). In addition to each of the above portions, the controller portion further comprises shared memory (SM) 45, 47 and cache memory (CM) 49, 51, installed on a plurality of cache boards (caches) 41, 43 (in FIG. 2, only two are shown), as well as a first SVP 23 and second SVP 25, connected for example via a LAN.

Each of the CHAs 37, 39 comprise communication ports 37a, 39a to perform data communication with for example the host device 35. In addition to the above, each of the CHAs 37, 39 is configured as a microcomputer system comprising a CPU, memory and similar, and interprets and executes various commands received for example from the host device 35. A network address for identification (for example, an IP address an WWN (World Wide Name)) is allocated to each of the CHAs 37, 39, and each can behave as independent NAS (Network Attached Storage). When a plurality of host devices (35) exist, each of the CHAs 37, 39 can receive requests from each of the host devices (35). The CHA 39 is connected via the communication network 65 to a host device (not shown) separate from the host device 35, and to another storage apparatus (not shown).

Each of the DKAs 53, 55 respectively comprise communication ports 53a, 55a necessary for connection to a plurality of PDEVs ($61_1$ to $61_4$, $63_1$ to $63_4$), in order to exchange data with the PDEVs ($61_1$ to $61_4$, $63_1$ to $63_4$) in for example a RAID configuration. In addition to the above, each of the DKAs 53, 55 is configured as a microcomputer system comprising a CPU, memory and similar, and writes data received by the CHA 37 from the host device 35 to a prescribed address of a prescribed PDEV ($61_1$ to $61_4$, $63_1$ to $63_4$) based on a request (write command) from the host device 35. Each of the DKAs 53, 55 reads data from a prescribed address of a prescribed PDEV ($61_1$ to $61_4$, $63_1$ to $63_4$) based on a request (read command) from the host device 35, and transmits the data via the CHA 37 to the host device 35.

When performing data input/output with a PDEV ($61_1$ to $61_4$, $63_1$ to $63_4$), each of the DKAs 53, 55 converts a logical address into a physical address. When the PDEVs ($61_1$ to $61_4$, $63_1$ to $63_4$) are managed according to a RAID configuration, the DKAs 53, 55 perform data access according to the RAID configuration.

The first SVP 23 and second SVP 25 are connected, as respective management consoles, to a control unit (not shown) used for monitoring and control of operations of the overall storage apparatus 3. The first SVP 23 and second SVP 25 display fault information in the storage apparatus 3, transmitted from the respective control units (not shown), on a display portion, and issue instructions for blockage processing of PDEVs ($61_1$ to $61_4$, $63_1$ to $63_4$) to the control units (not shown).

The CMs 49, 51 temporarily store data received by the CHA 37 from the host device 35 and data read by the DKAs 53, 55 from the PDEVs ($61_1$ to $61_4$, $63_1$ to $63_4$), respectively.

Control information and similar is stored in the SMs 45, 47. Work areas are set in the SMs 45, 47, and in addition, for example, mapping tables or various other data are also stored therein.

The storage device portion comprises a plurality of PDEVs ($61_1$ to $61_4$, $63_1$ to $63_4$). As the PDEVs ($61_1$ to $61_4$, $63_1$ to $63_4$), for example, hard disks, flexible disks, magnetic tape, semiconductor memory, optical discs, or other devices can be used.

Figure 3:
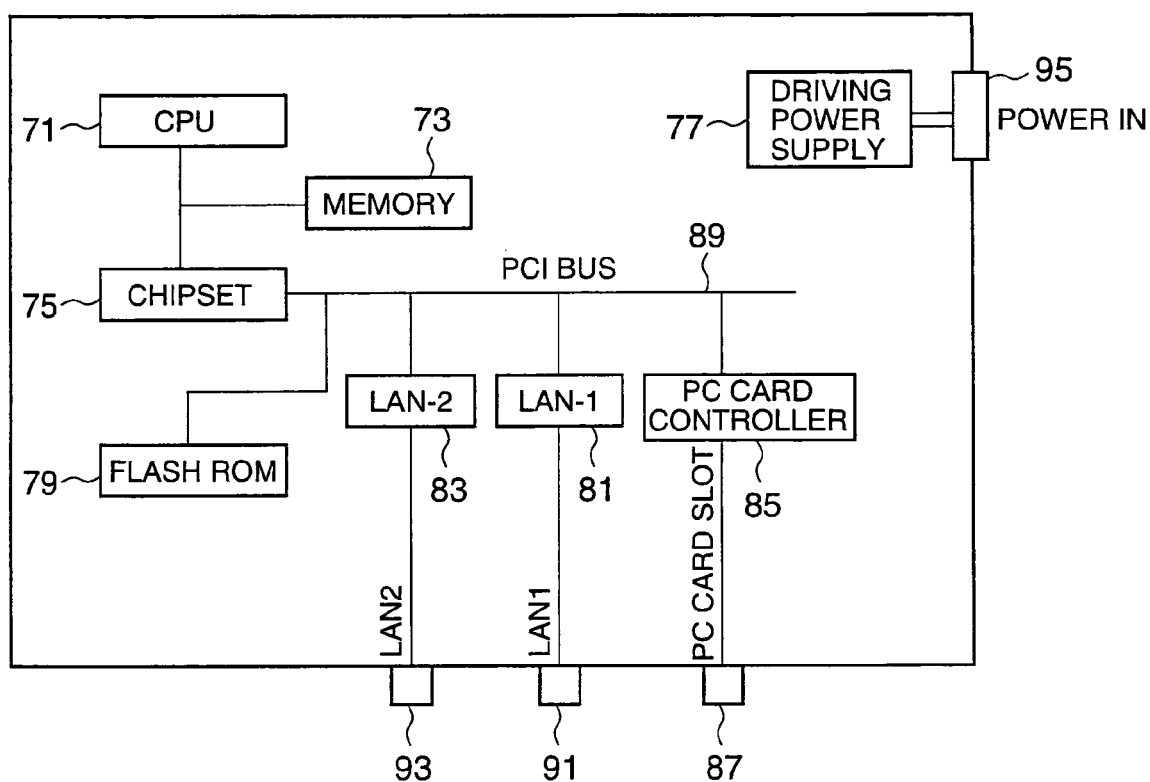
FIG. 3 is a block diagram showing details of the circuit configuration of the first SVP and second SVP comprised by the storage apparatus in FIG. 1.

FIG. 3 is a block diagram showing details of the circuit configuration of the first SVP 23 and second SVP 25 comprised by the storage apparatus 3 in FIG. 1. As already stated, the first SVP 23 and second SVP 25 comprise the same circuit configuration; hence in the following, the circuit configuration shown in FIG. 3 is explained as the circuit configuration of the first SVP 23.

As shown in FIG. 3, the first SVP 23 comprises a CPU 71, memory 73, chipset 75, driving power supply 77, flash ROM 79, first LAN connection circuit 81, second LAN connection circuit 83, PC card controller 85, and modem card 87. In addition to the above portions, the first SVP 23 further comprises a PCI bus 89, first LAN I/O port 91, second LAN I/O port 93, and power supply input terminal 95.

An OS and other programs necessary for the first SVP 23 to realize for example the above-described notification functions and SNMP functions, and fixed data, are stored in the memory 73. The memory 73 outputs the above fixed data to the CPU 71 in response to data read requests from the CPU 71. The chipset 75 controls operation, under the control of the CPU 71, of the flash ROM 79, first LAN connection circuit 81, second LAN connection circuit 83, and PC card controller 85, via the PCI bus 89.

The flash ROM 79 has functions similar to those of EEPROM, and is comprised by the first SVP 23 in place of the HDD, FDD, CD-ROM, or other storage unit incorporated into an ordinary PC. In this aspect, the flash ROM 79 is a PC card used by insertion into a PCMCIA slot provided in the first SVP 23. The data (information) stored in the flash ROM 79 may be, for example, configuration information for the storage apparatus 3 described below (such as is explained in the second aspect of this invention), SIMs (Service Information Messages), logs, events, and other information.

The first LAN connection circuit 81 is connected to for example the communication network 29 shown in FIG. 1 via the first LAN I/O port 91. On the other hand, the second LAN connection circuit 83 is connected for example to the external LAN 33 shown in FIG. 1 via the second LAN I/O port 93. By connecting the first LAN connection circuit 81 to the communication network 29 via the first LAN I/O port 91 and the second LAN connection circuit 83 to the external LAN 33 via the second LAN I/O port 93, data exchange is made possible between the MP 15 or MP 17 and the maintenance PC via the first SVP 23. Similarly, data exchange between the client terminal 5 and the MP 15 or MP 17, and data exchange between the remote maintenance center terminal 13 and the MP 15 or MP 17, are also possible.

The PC card controller 85 is driven by for example the remote maintenance center terminal 13 (shown in FIG. 1) when executing remote maintenance of the storage apparatus 3, and controls connection between the PCI bus 89 and the modem card 87 inserted into a PC card slot provided in the first SVP 23.

The CPU 71 controls operation of each of the portions of the above-described first SVP 23. The CPU 71 performs data exchange with the MP 15 or MP 17 via the PCI bus 89, first LAN connection circuit 81, first LAN port 91, and information network 29. The CPU 71 performs data exchange with the maintenance PC 7 and client terminal 5 via the PCI bus 89, second LAN connection circuit 83, second LAN port 93, and external LAN 33.

The driving power supply 77 stores electric power provided through the power supply input terminal 95, and is a direct-current power supply (battery or otherwise) which provides, as a driving voltage, a prescribed DC voltage to the various portions of the first SVP 23.

FIG. 4 is an explanatory drawing showing a list of the respective functions of the first SVP 23 (or second SVP 25), maintenance PC 7, client terminal 5, and remote maintenance center terminal 13 shown in FIG. 1.

In FIG. 4, the device settings made by the maintenance PC 7 (task to make various settings in the storage apparatus 3), and functions relating to maintenance of the storage apparatus 3, are as stated above functions for which ease of operation is required rather than reliability. Device settings includes configuration information settings relating to the above-described storage apparatus 3, and initial settings of the storage apparatus 3; on the other hand, maintenance tasks include device state display, fault log information display, setting and updating thresholds and similar, replacement of parts, microprogram replacement, and data dumps.

In maintenance tasks, microprogram replacement refers to tasks to replace a microprogram installed in the MP 15 and MP 17 shown in FIG. 1; a data dump is output of an operation log when collecting fault information, which is information necessary for analysis of a fault occurring in the storage apparatus 3. The above-described maintenance tasks are performed using the maintenance PC 7, as indicated by the double-circle symbols in FIG. 4.

The first SVP 23 (or second SVP 25) has functions to support (remote maintenance center terminal 13) monitoring and remote maintenance functions, and functions relating to SNMP notification; comparatively high reliability is demanded for all these functions. Here, monitoring functions are functions for viewing setting information within the storage apparatus 3 from a terminal 13 in the maintenance center (that is, a remote maintenance center terminal), existing at a location remote from the storage apparatus 3. In other words, for the first SVP 23 (or second SVP 25) to have functions supporting monitoring and remote maintenance functions means that the first SVP 23 (or second SVP 25) functions as a window, so to speak, for a terminal existing at a remote site (that is, the remote maintenance center terminal 13) separate from the storage apparatus 3. The terminal which is operated to realize the above-described monitoring and remote maintenance functions is the remote maintenance center terminal 13, as indicated by the double-circle symbols; the terminal which is operated to realize SNMP notification functions is the client terminal 5, as also indicted by a double-circle symbol.

As explained above, according to the first aspect of the invention the maintenance PC 7 and the first SVP 23 (or second SVP 25) are physically separated, so that the first SVP 23 (or second SVP 25) can provide support for monitoring and remote maintenance functions for which high reliability is demanded.

Moreover, the hardware of SVPs (first SVP 23, second SVP 25) which must be installed in each cluster comprised by the storage apparatus 3 can be made small, so that the costs of the entire storage apparatus 3 can be reduced.

Further, by reducing the size of the SVP hardware (first SVP 23, second SVP 25), the space required for installation of the SVP (first SVP 23, second SVP 25) in the storage apparatus 3 is decreased, so that installation in a dual configuration of SVPs (first SVP 23, second SVP 25) in the storage apparatus 3 can be accomplished easily.

Moreover, the maintenance PC 7, for which advanced functionality and satisfactory ease of operation are demanded, can be positioned outside the storage apparatus 3, and the maintenance PC 7 can be shared among a plurality of storage apparatuses, so that the costs of a storage system comprising a plurality of storage apparatuses (3) can be reduced.

However, in the prior art, monitoring of an SVP (and whether the state thereof is normal) has principally been performed by one of the following two methods.

In the first method, dedicated hardware separate from the SVP to be monitored is provided to monitor the SVP, communication with the SVP is performed by the dedicated hardware, and when there is no response to the dedicated hardware from the SVP, a fault is judged to have occurred in the SVP. In the second method, an application program installed in the SVP monitors its own operation, and when as a result its own operation is judged to be anomalous, the SVP is rebooted (restarted).

However, in the above-described first method the dedicated hardware used to monitor the SVP is not dually configured (redundant), and so there is the problem that should the dedicated hardware malfunction, a fault occurring in the SVP cannot be detected. And, when the SVP is dually configured (redundant, with a first SVP and second SVP), there is the possibility that both the dually configured SVPs will be judged to be anomalous. In the above-described second method, the application program installed on the SVP monitors itself for expected operation, or in other words, judges whether operation is the desired operation, so there is the problem that when a malfunction occurs in the hardware (of the SVP being monitored) and the application program no longer operates, an anomaly occurring in the SVP being monitored can no longer be detected.

Hence in light of the above, this inventor proposes a storage apparatus configured as described below.

Figure 5:
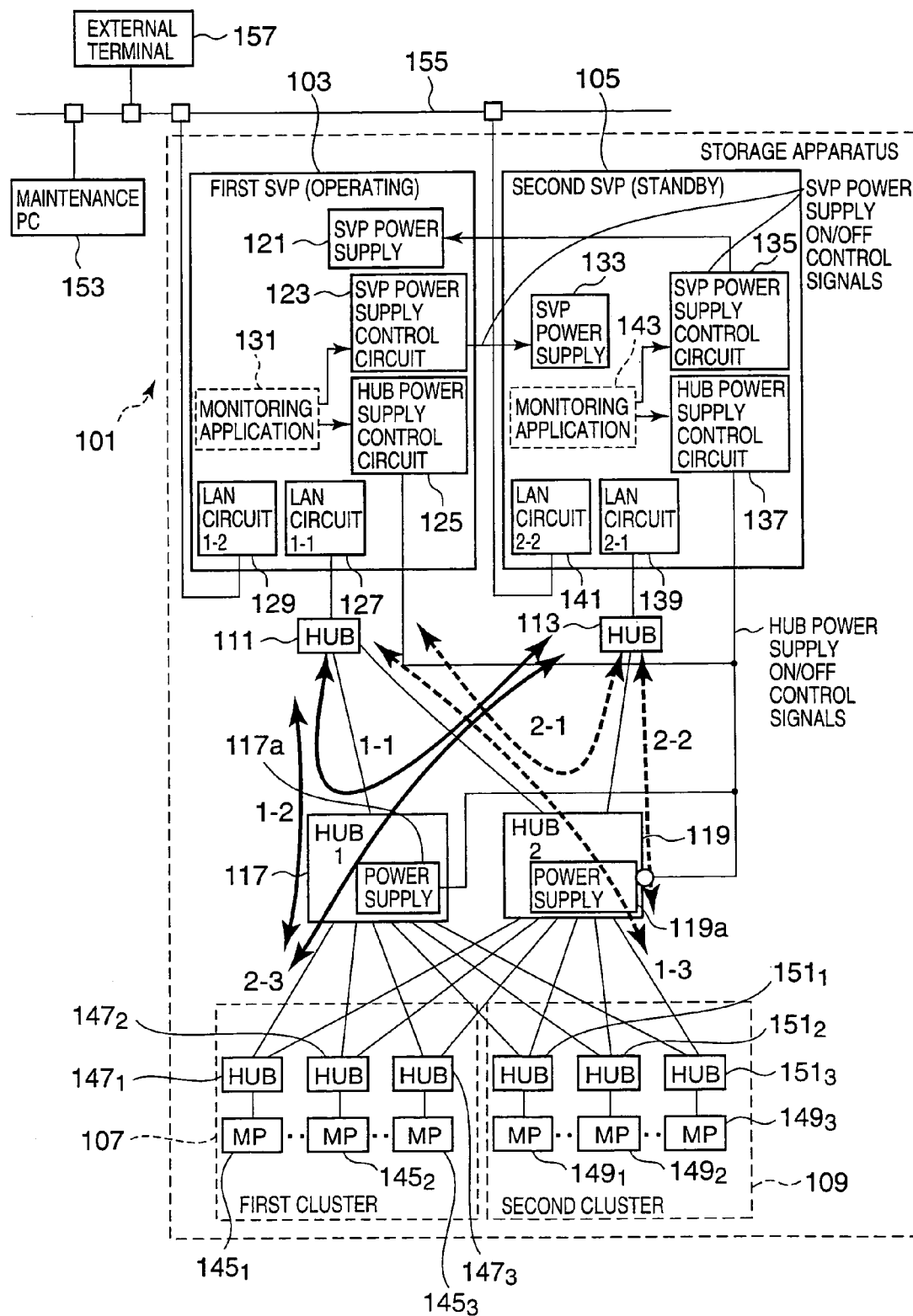
FIG. 5 is a block diagram showing the circuit configuration within the storage apparatus of a second aspect of the invention.

FIG. 5 is a block diagram showing the circuit configuration within the storage apparatus of a second aspect of the invention.

As shown in FIG. 5, the storage apparatus 101 comprises a first SVP 103, second SVP 105, first cluster 107, second cluster 109, hub 111 on the side of the first SVP 103, hub 113 on the side of the second SVP 105, hub 117 on the side of the first cluster 107, and hub 119 on the side of the second cluster 109. The first SVP 103 and second SVP 105 comprise the same internal configuration.

That is, the first SVP 103 comprises an SVP power supply 121, SVP power supply control circuit 123, hub power supply control circuit 125, first LAN connection circuit 127, and second LAN connection circuit 129, which are hardware, as well as a monitoring application 131, which is an application program. The second SVP 105, similarly to the first SVP 103, comprises an SVP power supply 133, SVP power supply control circuit 135, hub power supply control circuit 137, first LAN connection circuit 139, and second LAN connection circuit 141, which are hardware, as well as a monitoring application 143, which is an application program.

The hub 117 incorporates a driving power supply 117a having a control signal non-inverting input terminal. Similarly, the hub 119 incorporates a driving power supply 119a having a control signal inverting input terminal.

The first cluster 107 incorporates a plurality of MPs (for convenience in the drawing and explanation, only three are shown in FIG. 5, assigned the symbols $145_1$, $145_2$, $145_3$), and a plurality of hubs provided corresponding to the MPs (for convenience in the drawing and explanation, only three are shown in FIG. 5, assigned the symbols $147_1$, $147_2$, $147_3$). Similarly, the second cluster 109 incorporates a plurality of MPs (for convenience in the drawing and explanation, only three are shown in FIG. 5, assigned the symbols $149_1$, $149_2$, $149_3$), and a plurality of hubs provided corresponding to the MPs (for convenience in the drawing and explanation, only three are shown in FIG. 5, assigned the symbols $151_1$, $151_2$, $151_3$).

The symbol 153 denotes a maintenance PC connected, via an external LAN 155, to the first SVP 103 or to the second SVP 105 (within the storage apparatus 101); the symbol 157 denotes a client terminal, remote maintenance center terminal, or other external terminal connected, via the external LAN 155, to the first SVP 103 or to the second SVP 105 (within the storage apparatus 101).

In this aspect, the first SVP 103 and second SVP 105 both are always placed in a state enabling execution of prescribed processing operation at any time (hereafter called the "driven state"), and adopt a redundant (dual) configuration. When the driven states of the first SVP 103 and second SVP 105 are both normal, the first SVP 103 takes priority over the second SVP 105 in executing prescribed processing operation, and so long as the first SVP 103 normally executes the prescribed processing operation, the second SVP 105 remains in standby state.

The SVP power supply control circuit 123 outputs control signals (SVP power on/off control signals) at a prescribed logic level to the SVP power supply 133 on the side of the second SVP 105, based on control operation start instructions from the monitoring application 131. On the other hand, the hub power supply control circuit 125 outputs control signals (hub power on/off control signals) at a prescribed logic level to the driving power supply 117a of the hub 117 and the driving power supply 119a of the hub 119. In this aspect, the driving power supply 117a of the hub 117 and driving power supply 119a of the hub 119 are both set to turn on when a control signal at logic level "L" is applied.

The first LAN connection circuit 127 is connected via the hub 111 to the hub 117 and the hub 119.

The second LAN connection circuit 129 is connected via the external LAN 155 to the maintenance PC 153 and to the external terminal 157. The first LAN connection circuit 127 is connected via the hub 111 to the hub 117 and the hub 119, and the second LAN connection circuit 129 is connected via the external LAN 155 to the maintenance PC 153 and to the external terminal 157, so that data can be exchanged via the first SVP 103 between the MPs $145_1$ to $145_3$, the MPs $149_1$ to $149_3$, the maintenance PC 153, and the external terminal 157.

The SVP power supply 121 supplies a driving power supply to each of the above portions comprised by the first SVP 103. Supply of the above driving power supply by the SVP power supply 121 is continued so long as a SVP power supply on control signal at a prescribed logic level is output from the SVP power supply control circuit 135 on the side of the second SVP 105, and is halted upon switching to an SVp power supply off control signal from the SVP power supply on control signal.

So long as the first SVP 103 is operating in the normal state, the second SVp 105 continues in the standby state. The second SVP 105 comprises the same internal configuration as the first SVP 103, and in addition performs processing operation similar to that of the first SVP 103, and so a detailed explanation of the internal configuration of the second SVP 105 is omitted.

The above control signals are input, via the control signal non-inverting input terminal, to the driving power supply 117a of the hub 117, while the above control signals are input via the control signal inverting input terminal to the driving power supply 119a of the hub 119. That is, when the driving power supply 117a is on and the hub 117 is in the driven state, the driving power supply 119a is off and the hub 119 is placed in the driving-halted state. Conversely, when the driving power supply 117a is off and the hub 117 is placed in the driving-halted state, the driving power supply 119a is on and the hub 119 is in the driven state.

When the first SVP 103 is operating normally, in order to drive the hub 117 a signal with logic level "L" is output from the hub power supply control circuit 125 (on the side of the first SVP 103) as a hub power supply on/off control signal, and by this means the driving power supply 117a on the side of the hub 117 is turned on. However, the above signal with logic level "L" is inverted to logic level "H" on passing through the inverting input terminal before being applied to the driving power supply 119a of the hub 119, so that the driving power supply 119a of the hub 119 is not turned on.

Conversely, when the second SVP 105 is started from the standby state, a signal with logic level "H" is output as the hub power supply on/off control signal from the hub power supply control circuit 137 (on the side of the second SVP 105), and this is inverted to logic level "L" on passing through the inverting input terminal before being applied to the driving power supply 119a of the hub 119, so that the driving power supply 119a of the hub 119 is turned on. However, the control signal with logic level "H" passes through the non-inverting input terminal and is applied without change to the driving power supply 117a of the hub 117, so that the driving power supply 117a of the hub 117 is not turned on.

In this aspect, as shown in FIG. 5, a configuration is adopted such that a hub power supply on/off control signal can be output to the driving power supply 117a of the hub 117 and to the driving power supply 119a of the hub 119 from either the hub power supply control circuit 125 of the first SVP 103, or from the hub power supply control circuit 137 of the second SVP 105.

Thus when one hub (117) is in the driven state, by placing the other hub (119) in the driving-halted state, the problem of duplicated transfer of data to be transferred from for example the MP 145, of the first cluster 107 to the first SVP 103 and second SVP 105 can be prevented. For example, when both the hubs 117 and 119 are in the driven state, data sent from the MP $145_1$ is transferred to the first SVP 103 via the hub $147_1$, hub 117, and hub 111, and is also transferred to the first SVP 103 via the hub $147_1$, hub 119, and hub 111. Simultaneously, the above data is transferred to the second SVP 105 via the hub $147_1$, hub 117, and hub 113, and is also transferred to the second SVP 105 via the hub $147_1$, hub 119, and hub 113.

However, if the hub 119 is placed in the driving-halted state, data sent from the MP $145_1$ is not transferred to the first SVP 103 via the hub $147_1$, hub 119, and hub 111, nor is the above data transferred to the second SVP 105 via the hub $147_1$, hub 119, and hub 113. Hence the problem of duplicated transfer of data to be transferred from the MP $145_1$ of the first cluster 107 to the first SVP 103 and second SVP 105 can be prevented.

In the first SVP 103, the monitoring application 131, upon being started, sends control operation start instructions to the SVP power supply control circuit 123 and to the hub power supply control circuit 125. The monitoring application 131 executes a communication test with the first SVP 103 and second SVP 105 and a communication test with the first SVP 103 and all MPs ($145_1$ to $145_3$, $149_1$ to $149_3$), via for example the first LAN connection circuit 127 and second LAN connection circuit 129, and records the results of execution of these communication tests in a management table, described below. Of course, in the communication test with the second SVP 105, the monitoring application 143 of the second SVP 105 must perform processing operation similar to that of the monitoring application 131. In other words, the first SVP 103 and second SVP 105 both monitor each other to judge normal operation of the other (SVP).

In the above communication tests, when for example there is no response from (the monitoring application 131 of) the first SVP 103, even after a fixed time has elapsed, in response to a query from (the monitoring application 143 of) the second SVP 105, (the monitoring application 143 of) the second SVP 105 judges an anomaly to have occurred in the first SVP 103. As a result, the SVP power supply control circuit 135 outputs an SVP power supply off control signal to the driving power supply, that is, the SVP power supply 121 of the first SVP 103, to turn off the SVP power supply 121. The second SVP 105 then immediately leaves the standby state and executes prescribed processing operation in place of the first SVP 103.

In the above-described communication test with all MPs ($145_1$ to $145_3$, $149_1$ to $149_3$), or in normal communications with all the above MPs ($145_1$ to $145_3$, $149_1$ to $149_3$), the monitoring application 131 performs updates of the configuration information of the storage apparatus 101, SIMs (Service Information Messages), logs, events in the storage apparatus 101, and other information stored in the flash ROM within the first SVP 103. The monitoring application 131 performs communication with the monitoring application 143 of the second SVP 105 in the standby state, with the timing of the above information updates. Through this communication, the same information stored in the flash ROM of the second SVP 105 is also updated, so that the first SVP 103 and second SVP 105 always have the same information.

Here the MPs ($145_1$ to $145_3$, $149_1$ to $149_3$), maintenance PC 153, and external terminal (client terminal, remote maintenance center terminal, or similar) 157 communication with (the monitoring application 131 of) the IP address of the first SVP 103, and so no communication is performed with (the monitoring application 143 of) the second SVP 105, which is the SVP in standby state. When the second SVP 105 makes a transition from the standby state to the operating state due to a malfunction (anomaly) in the first SVP 103, the monitoring application 143 of the second SVP 105 turns off the SVP power supply 121 of the first SVP 103 via the SVP power supply control circuit 135, and in addition writes the IP address of the second SVP 105 to the value of the first SVP 103. By this means, the MPs ($145_1$ to $145_3$, $149_1$ to $149_3$), maintenance PC 153, and external terminal 157 (client terminal, remote maintenance center terminal, or similar) can communicate with (the monitoring application 143 of) the second SVP.

As the above communication test method, for example, the LAN protocol PING may be used, and according to whether there is a response from the other communication device (that is, from the second SVP 105, and from an MP ($145_1$ to $145_3$, $149_1$ to $149_3$)), a judgment is made as to whether operation of the other device (that is, the second SVP 105 or the MP ($145_1$ to $145_3$, $149_1$ to $149_3$)) is normal or anomalous. The above communication test is performed periodically at fixed time intervals, and the result of the communication test is recorded in the management table, described below.

For example, assuming that the second SVP 105 is operating and the first SVP 103 is in the standby state, the monitoring application 131 executes the monitoring operation described below to ascertain the operating state of the second SVP 105, hub 113, and hub 119 which are the other communication devices. Then, according to the criteria for "judgment of malfunction using management table information" described below, processing is executed to identify the location of the malfunction (anomaly), halt driving of the second SVP 105, and start up the first SVP 103, which had been in the standby state.

Figure 6:
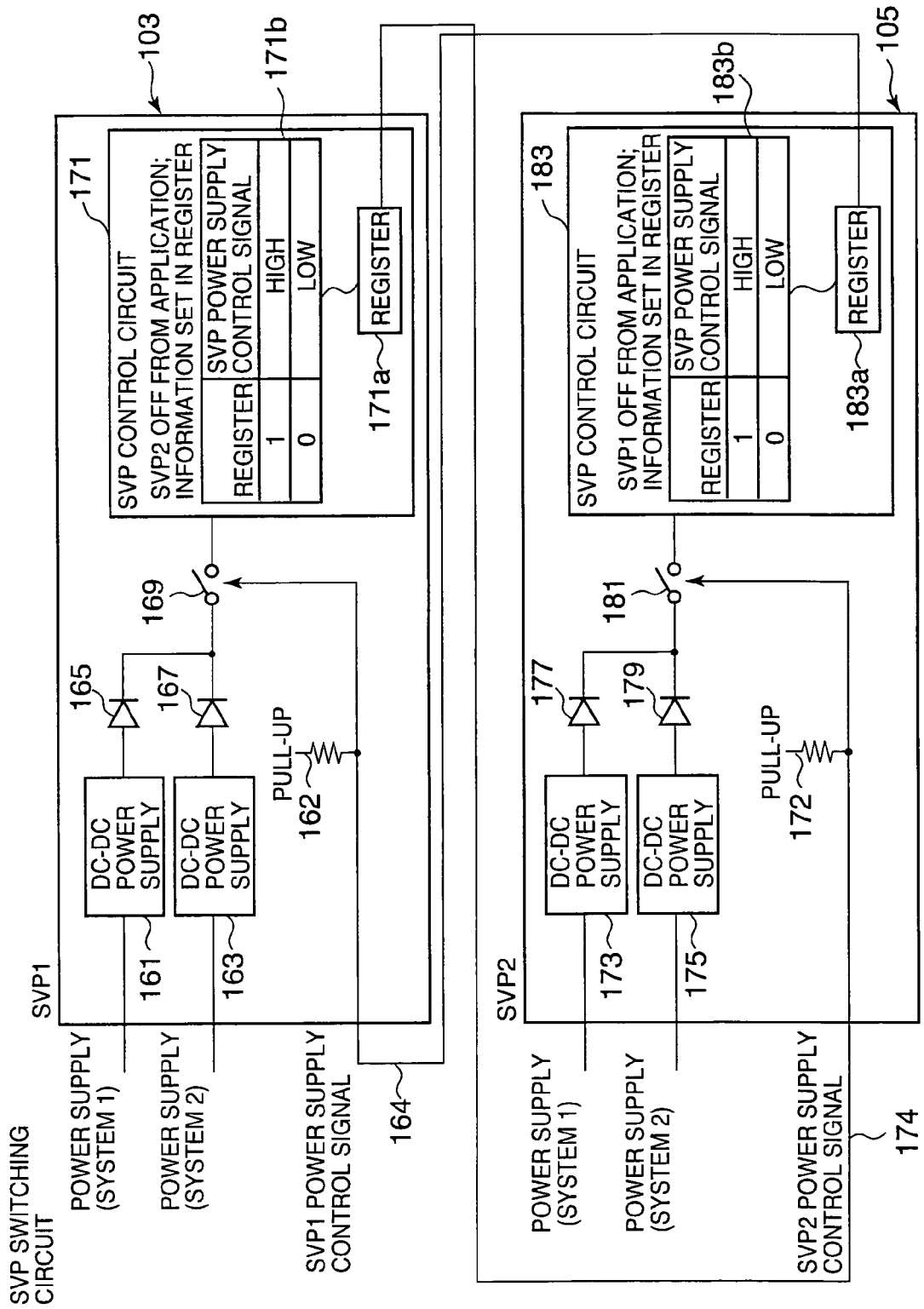
FIG. 6 is a block diagram showing the mode of on/off switching control of the SVP power supply, performed within the first SVP and second SVP.

FIG. 6 is a block diagram showing the mode of on/off switching control of the SVP power supply (121, 133), performed within the first SVP 103 and second SVP 105.

As shown in FIG. 6, two DC-DC power supplies 161, 163 and two diodes 165, 167 to prevent reverse currents are incorporated in the first SVP 103 as the SVP power supply 121 shown in FIG. 5. In addition to the above, the first SVP 103 also incorporates a switching mechanism which performs switching according to an on/off control signal applied from outside such as a semiconductor switching element (hereafter simply "switching element") 167, and an SVP control circuit 171.

Similarly to the first SVP 103, the second SVP 105 also incorporates two DC-DC power supplies 173, 175 and two diodes 177, 179 for reverse-current prevention as the SVP power supply 133 shown in FIG. 5. In addition to the above, the second SVP 105 also incorporates a switching element (for example a semiconductor switching element) 181 which performs switching according to an on/off control signal applied from outside, and an SVP control circuit 183.

In the first SVP 103, the DC-DC power supply 161 receives power from, for example, a first power supply system comprised within the storage apparatus 101 shown in FIG. 5, and when the switching element 169 is turned on, applies a prescribed driving voltage (DC voltage) to the SVP control circuit 171 via the diode 165 for reverse current prevention and the switching element 169. On the other hand, the DC-DC power supply 163 receives power from for example a second power supply system comprised within the storage apparatus 101, and when the switching element 169 is turned on, applies a prescribed driving voltage (DC voltage) to the SVP control circuit 171 via the diode 167 for reverse current prevention and switching element 169.

The SVP control circuit 171 enters the driven state due to the prescribed driving voltage applied by the DC-DC power supply 161 (or, the DC-DC power supply 163) via the switching element 169 which is in the turned-on state, and controls operation of the various portions comprised by the first SVP 103. The SVP control circuit 171 comprises a register 171a used to set information (off information for the second SVP 105) 171b to halt driving of the second SVP 105. The off information 171b for the second SVP 105 is set in the register 171a upon detection of the occurrence of a malfunction (fault) in the second SVP 105 by, for example, the monitoring application 131 shown in FIG. 5.

The switching element 169 performs on/off switching according to an SVP power supply on/off control signal from (the register 183a of) the SVP control circuit 183 of the second SVP 105, via a control signal line 164 pulled up to a prescribed potential by a pull-up resistance 162 in the first SVP 103. The switching element 169 switches to off when for examine the monitoring application 143 shown in FIG. 5 detects the occurrence of a malfunction (anomaly) in the first SVP 103, and sets the off information 183b for the first SVP 103 in the register 183a. In other words, by setting the off information 183b of the first SVP 103 in the register 183a, an SVP power supply off control signal is applied to the switching element 169 from the register 183a via the control signal line 164 pulled up to a prescribed potential by the pull-up resistance 162 within the first SVP 103. As a result, the switching element 169 switches to off, and the first SVP 103 enters the driving-halted state.

In the second SVP 105, the switching element 181 switches off when for example the monitoring application 131 shown in FIG. 5 detects the occurrence of a malfunction (anomaly) in the second SVP 105, and off information 171b for the second SVP 105 is set in the register 171a. That is, by setting off information 171b for the second SVP 105 in the register 171a, an SVP power supply off control signal is applied to the switching element 181 from the register 171a via the control signal line 174, which is pulled-up to a prescribed potential by the pull-up resistance 172 within the second SVP 105. As a result, the switching element 181 switches to off, and the second SVP 105 enters the driving-halted state.

Figure 7:
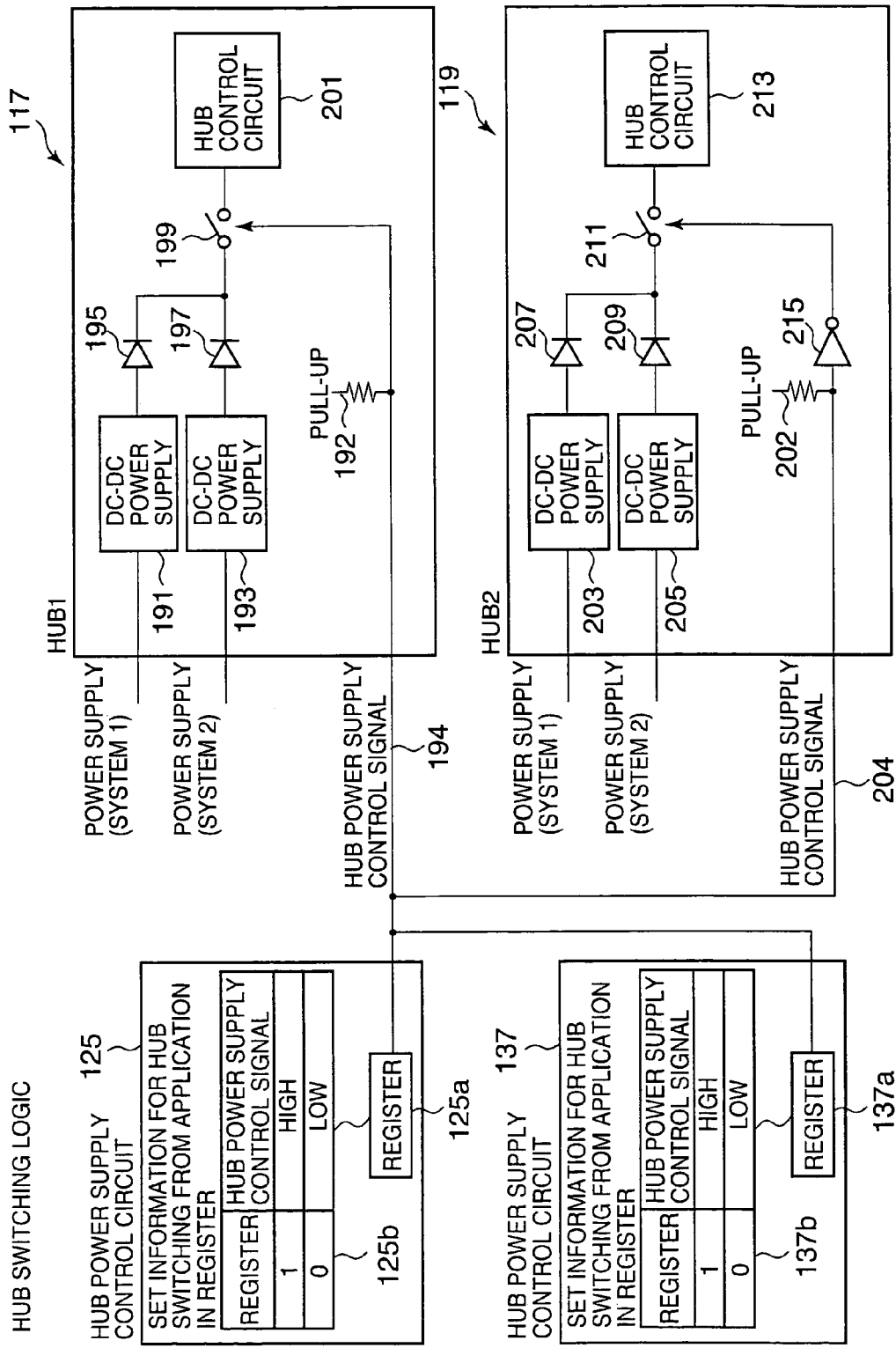
FIG. 7 is a block diagram showing the mode of on/off switching control performed within the storage apparatus.

FIG. 7 is a block diagram showing the mode of on/off switching control for hubs 117, 199 performed within the storage apparatus 101.

As shown in FIG. 7, the hub 117 incorporates, as the driving power supply 117a shown in FIG. 5, two DC-DC power supplies 191, 193, and two diodes 195, 197 for reverse-current prevention. In addition to the above, the hub 117 also incorporates a switching mechanism which performs switching according to an on/off control signal applied from outside such as a semiconductor switching element (hereafter simply "switching element") 199, and a hub control circuit 201.

Similarly to the hub 117, the hub 119 incorporates, as the driving power supply 119a shown in FIG. 5, two DC-DC power supplies 203, 205, and two diodes 207, 209 for reverse-current prevention. In addition to the above, the hub 119 also incorporates a switching element (for example a semiconductor switching element) 211 which performs switching according to an on/off control signal applied from outside, a hub control circuit 213, and an inverter 215.

In the hub 117, the DC-DC power supply 191 receives power from, for example, a first power supply system comprised within the storage apparatus 101 shown in FIG. 5, and when the switching element 199 is turned on, applies a prescribed driving voltage (DC voltage) to the hub control circuit 201 via the diode 195 for reverse current prevention and the switching element 199. On the other hand, the DC-DC power supply 193 receives power from for example a second power supply system comprised within the storage apparatus 101, and when the switching element 199 is turned on, applies a prescribed driving voltage (DC voltage) to the hub control circuit 201 via the diode 197 for reverse current prevention and switching element 199.

The hub control circuit 201 enters the driven state due to the prescribed driving voltage applied by the DC-DC power supply 191 (or, the DC-DC power supply 193) via the switching element 199 which is in the turned-on state, and controls operation of the various portions comprised by the hub 117.

The switching element 199 is held in the on state when a control signal at logic level "L" is applied via a control signal line 194 pulled up to a prescribed potential by a pull-up resistance 192 within the hub 117, and when a control signal with logic level "H" is applied, switches from the on state to the off state.

In the hub 119, the DC-DC power supplies 203, 205, diodes 207 and 209 for reverse-current prevention, switching element 211, pull-up resistance 202, and hub control circuit 213 are the same as the DC-DC power supplies 191, 193, diodes 195 and 197 for reverse-current prevention, switching element 199, pull-up resistance 192, and hub control circuit 201, respectively, in the hub 117.

Similarly to the switching element 199, the switching element 211 is held in the on state when a control signal with logic level "L" is applied, and is switched from the on state to the off state when a control signal with logic level "H" is applied. An on/off control signal transmitted from outside is applied to the switching element 211 after inversion of the logic level by the inverter element 215.

The hub power supply control circuit 125 incorporates a register 125a in which is set information 125b to switch the operating hub from the hub 119 to the hub 117. The information 125b to switch the above operating hub is set in the register 125a as a result of, for example, detection of the occurrence of a malfunction (anomaly) in the second SVP 105 by the monitoring application 131 shown in FIG. 5. By setting the information 125b to perform the above switching in the register 125a, a control signal with logic level "L" is output from the register 125a. The control signal with logic level "L" output from the register 125a is applied to the hub 117 via the control signal line 194, and is also applied to the hub 119 via the control signal line 204.

The hub power supply control circuit 137 incorporates a register 137a in which is set information 137b to switch the operating hub from the hub 117 to the hub 119. The information 137b to switch the above operating hub is set in the register 137a as a result of, for example, detection of the occurrence of a malfunction (anomaly) in the first SVP 103 by the monitoring application 143 shown in FIG. 5. By setting the information 137b to perform the above switching in the register 137a, a control signal with logic level "H" is output from the register 137a. The control signal with logic level "H"

output from the register 137a is applied to the hub 117 via the control signal line 194, and is also applied to the hub 119 via the control signal line 204.

Figures 8, 10:
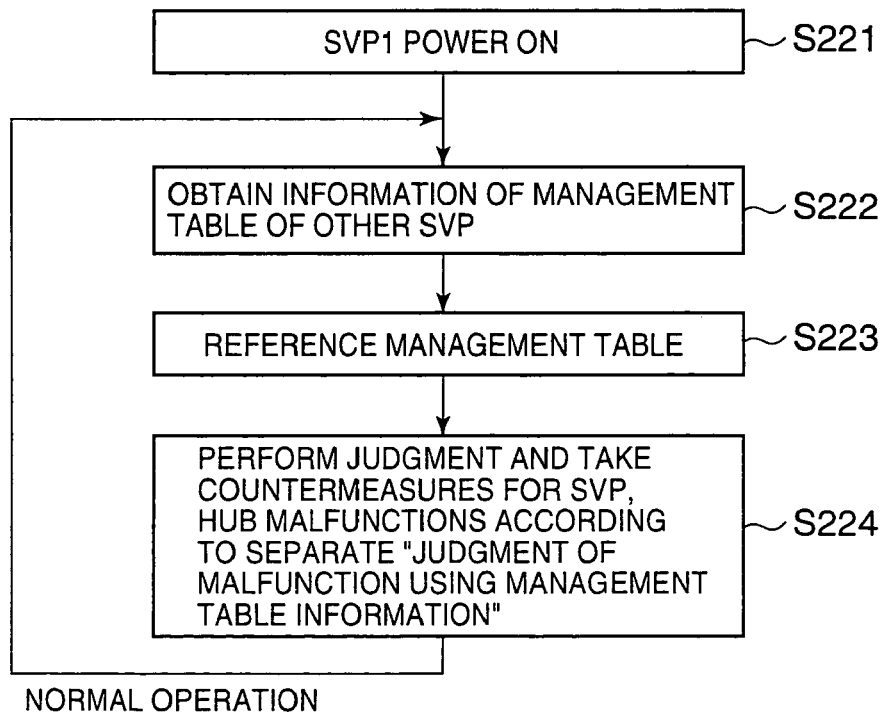
FIG. 8 is an explanatory drawing showing management tables comprised by the first SVP and second SVP shown in FIG. 5.
FIG. 10 is a flowchart showing processing operation executed by the monitoring application, based on the management table information shown in FIG. 8.

FIG. 8 is an explanatory drawing showing management tables comprised by the first SVP 103 and second SVP 105 shown in FIG. 5.

The management table shown in FIG. 8 records the results of communication tests by the monitoring applications 131 and 143 of FIG. 5; the information recorded in the management table serves as criteria for malfunction (anomaly) judgments by the monitoring applications 131, 143.

In FIG. 8, a communication result of "1" represents success, and a communication result of "0" represents failure. The management table for the first SVP 103 indicates success for the communication results over all the communication paths 1-1, 1-2, and 1-3; on the other hand, the management table for the second SVP 105 indicates failure for the communication results over all the communication paths 2-1, 2-2, 2-3.

FIG. 9 is an explanatory drawing showing results of malfunction judgments for the first SVP 103 and second SVP 105 performed by the monitoring applications 131 and 143, based on the management table information of FIG. 8, and correspondence based on the judgment results.

In FIG. 9, three cases, denoted by (a), (b), and (c), are described as examples of malfunction judgment results for the first SVP 103 and second SVP 105. In the respective cases, a total of six communication tests were performed for each of the SVPs (103, 105) over six communication paths (1-1, 1-2, 1-3, 2-1, 2-2, 2-3).

In the first case denoted by (a), no countermeasures are taken in the initial communication test performed for the first SVP 103. This is because the communication test results indicate that the first SVP 103 is judged to be operating normally. In the second through the fourth communication tests, a malfunction is judged to have occurred in the hub 117, and countermeasures are taken such that so switching is performed to turn the hub 117 off and turn the hub 119 on, and notification of the malfunction of hub 117 is issued. In the fifth and sixth communication tests, the location of the malfunction occurrence cannot be identified, and so a countermeasure is taken to judge the location of malfunction occurrence once again in the second case, described below, and switching processing is performed in which the hub 117 is turned off and the hub 119 is turned on. On the other hand, in the initial communication test performed for the second SVP 105 also, the judgments and countermeasures taken are similar to those of the initial communication test performed for the first SVP 103 as described above.

Next, in the second case denoted by (b), a malfunction in hub 117 is judged to have occurred in the initial and the third communication tests performed for the first SVP 103, and the countermeasure of issuing notification of the malfunction of the hub 117 is taken. In the second communication test, a malfunction is judged to have occurred in the LAN connecting the hub 117, hub 119, and second SVP 105, and the countermeasure of issuing notification of the malfunction of the hub 117 is taken. Then, in the fourth communication test it is judged that either malfunctions have occurred in both the hubs 117 and 119, or that a malfunction has occurred on the MP side, and the countermeasure of notification of these malfunctions is taken. In the fifth communication test, a malfunction is judged to have occurred in the hub 119, and the countermeasures of performing switching processing to turn off the hub 119 and turn on the hub 117, and of issuing notification of the malfunction of the hub 119, are taken. In the sixth communication test, it is judged that either a malfunction has occurred in the hub 119, or that a malfunction has occurred in both the hubs 117 and 119, and the countermeasures of performing switching processing to turn off the hub 119 and turn on the hub 117 and of issuing notification of the malfunction are taken. On the other hand, in the first through fourth communication tests performed for the second SVP 105, the judgments and countermeasures are similar to those in the first through fourth communication tests described above for the first SVP 103. In both the fifth and sixth communication tests, the countermeasures of performing switching operation to turn off the hub 119 and turn on the hub 117, and of giving priority to the first SVP 103, are taken.

Next, in the third case denoted by (c), in the first through fifth communication tests for the first SVP 103 countermeasures similar to those of the first through fifth communication tests performed for the first SVP 103 in the second case are taken. In the sixth communication test, a malfunction is judged to have occurred in the hub 117, and as countermeasures, switching processing is performed to halt operation of the first SVP 103 and begin operation of the second SVP 105, switching processing is performed to turn off the hub 119 and turn on the hub 117, and notification of the malfunction of the first SVP 103 is issued. On the other hand, in the first and third communication tests performed for the second SVP 105, the countermeasure of issuing notification of a malfunction in the hub 117 is taken and for the second communication test, the countermeasure of issuing notification of occurrence of a malfunction in the LAN connecting the hub 117, hub 119, and second SVP 105 is taken. In the fourth communication test, the countermeasure of issuing notification that either malfunctions have occurred in both hubs 117 and 119, or that a malfunction has occurred on the MP side, is taken. Next, in the fifth communication test, countermeasures similar to those for the sixth communication test of the first SVP 103 are taken. And in the sixth communication test, the countermeasures of performing switching processing to turn off the hub 119 and turn on the hub 117, and of giving priority to the first SVP 103 in judgments of fault location, are taken.

FIG. 10 is a flowchart showing processing operation executed by the monitoring applications 131 and 143, based on the management table information shown in FIG. 8.

In FIG. 10, first the driving power supply (SVP power supply) 121 of the first SVP 103 is turned on (step S221), and the information of the management table held by the other SVP (second SVP 105) is obtained (step S222). Then, the management table information obtained is referenced (step S223), and judgments are made as to whether malfunctions (anomalies) have occurred in the first SVP 103, second SVP 105, and hubs 117 and 119, according to the malfunction judgment pattern based on the management table information shown, for example, in FIG. 9 (step S224).

According to the above-described second aspect of the invention, there is dual monitoring of the communication paths between the first SVP 103, second SVP 105, and MPs ($145_1$ to $145_3$, $149_1$ to $149_3$) and of states within the storage apparatus 101 by the SVPs, so that the reliability of notification of faults relating to the storage apparatus 101 by the first SVP 103 and second SVP 105, and of information acquisition tasks, can be improved.

In the above-described first and second aspects of the invention, various tasks to make settings and perform maintenance on the storage apparatus (3, 101), for which ease of operation is demanded, are allotted to a maintenance PC (7, 153), whereas monitoring functions, functions for issuing notification to remote maintenance center terminals (13) and client terminals (5) and similar, for which high reliability is demanded, are allotted the first SVP (23, 103) and second SVP (25, 105). Consequently in the first and second aspects of the invention, the need arises to download information relating to the storage apparatus (3, 101) to the maintenance PC (7, 153) via the first SVP (23, 103) and second SVP (25, 105) at the time of maintenance tasks.

FIG. 11 is a flowchart showing a procedure for data communication performed among the various portions of the information processing system comprising a storage apparatus of a third aspect of the invention.

The hardware configuration in FIG. 11 corresponds to the hardware configuration of the information processing system shown in FIG. 5. In FIG. 11, there are two first SVPs, denoted by the symbol 233; these two first SVPs have the same hardware. The first SVP 233 has gateway functions, but does not function as an application.

One MP, denoted by the symbol 237, may for example represent the plurality of MPs ($145_1$ to $145_3$, $149_1$ to $149_3$) shown in FIG. 5. An MP 237 always accesses at specified IP address. Specification as an IP address is limited to that (IP address) of the first SVP 233, and because only the IP address of the first SVP 233 is known, access from the MP 237 is limited to the first SVP 233.

The maintenance PC 231 may be a so-called desktop-type fixed terminal, or may be a mobile terminal which can be carried by maintenance personnel. A program for operations is installed on the maintenance PC 231. The processing operation shown in FIG. 11 is performed centered on the first SVP 233.

In FIG. 11, first the MP 237 transfers to the first SVP 233, via the internal LAN of the storage apparatus, information relating to faults occurring within the storage apparatus (for example the storage apparatus 101 shown in FIG. 5), logs, event-related information, and similar (step S241). Upon receiving the above information from the MP 237, the first SVP 233 writes the above information to a prescribed storage area (information storage area) in the first SVP 233 (step S242). If the above information is judged by the monitoring application (denoted by the symbols 131 and 143 in FIG. 5) to requires SNMP or fault notification, notification is issued from the first SVP 233.

Next, the first SVP 233 transfers the above information, written to the information storage area, to the second SVP 235, which has been placed in the standby state. When the second SVP 235 receives the above information, it is written to a prescribed storage area (information storage area) within the second SVP 235 (by this means, information previously written to the information storage area is updated). By this means, the second SVP 235 holds the same information as does the first SVP 233 (step S243).

However, if after a fixed interval has elapsed the above information has not been transferred from the first SVP 233, the second SVP 235 issues an information transfer request to the first SVP 233 (step S244). Upon receiving this information transfer request, the first SVP 233 reads the information stored in the information storage area and transfers the information to the second SVP 235 (step S245). Upon receiving the above information, the second SVP 235 writes (copies) the information to the information storage area in the second SVP 235 (step S246). The reason for executing the processing of step S244 through step S246 is in order to reduce the possibility that mismatches may occur between the information held by the first SVP 233 and information held by the second SVP 235; if the information has not been transferred from the first SVP 233 even after the fixed interval has elapsed, by copying the information held by the first SVP 233 to the second SVP 235, mismatches between the information held by the first SVP 233 and information held by the second SVP 235 are prevented.

Next, when the maintenance PC 231 logs into the first SVP 233 (step S247), the information stored in the information storage area of the first SVP 233 is transferred from the first SVP 233 to the maintenance PC 231, and the information is written to the information storage area in the maintenance PC 231 (step S248). The application installed on the maintenance PC 231 (that is, the above-described operations program) recognizes the configuration and circumstances of the storage apparatus (101) (the environment of the storage apparatus 101), connects to the MP 237 via the first SVP 233, and executes maintenance operations on the storage apparatus 101. That is, the operator of the maintenance PC 231 operates the maintenance PC 231 to create an operation screen in the maintenance PC 231, and the operator uses the operation screen to transfer instructions to the MP 237 (step S249).

Figure 12A:
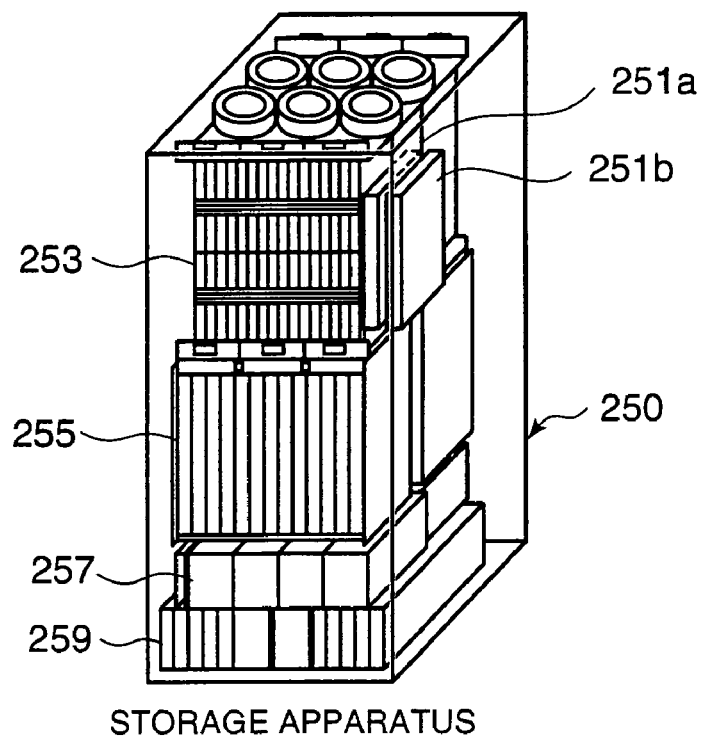
FIG. 12 is a perspective view of the overall configuration of a storage apparatus of the prior art and of the overall configuration of a SVP of the prior art.
Figure 12B:
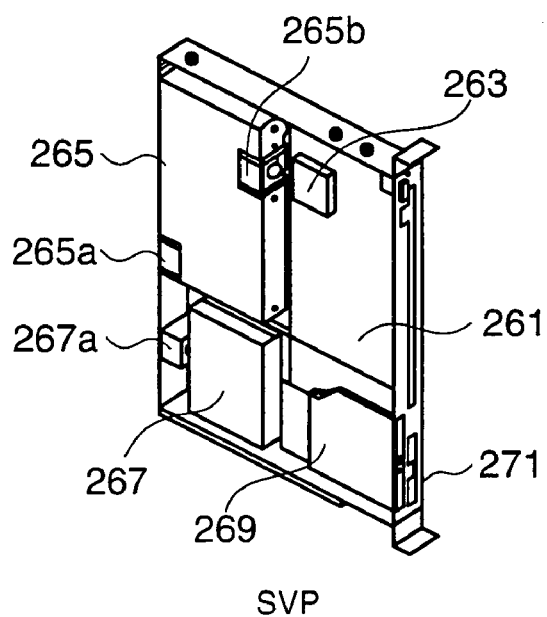
Figure 13A:
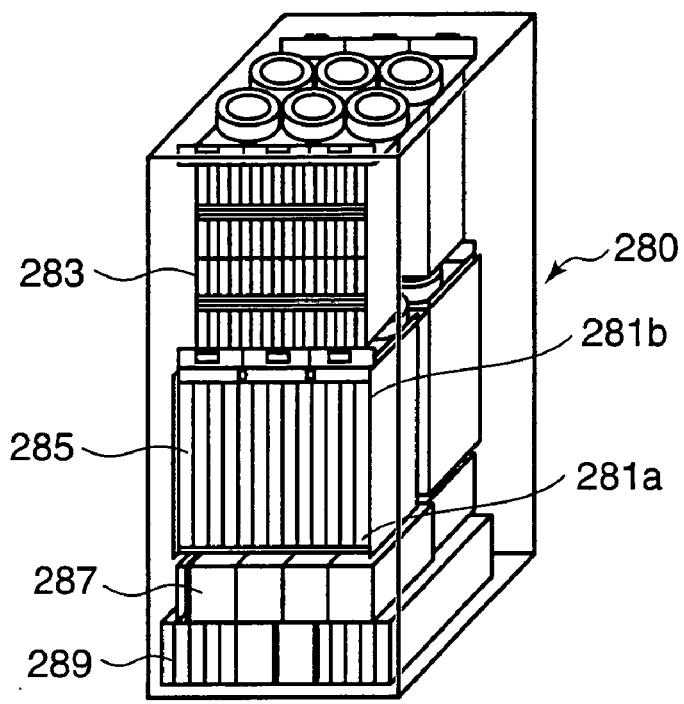
FIG. 13 is a perspective view showing the overall configuration of a storage apparatus of a fourth aspect of the invention and the overall configuration of a SVP of the fourth aspect of the invention.
Figure 13B:
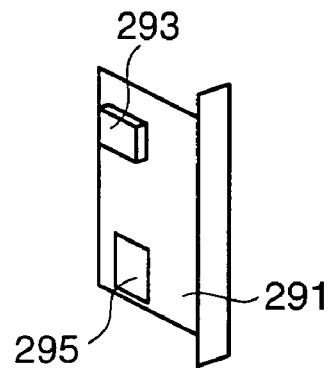

FIG. 12 is a perspective view of the overall configuration of a storage apparatus of the prior art and of the overall configuration of a SVP of the prior art. FIG. 13 is a perspective view showing the overall configuration of a storage apparatus of a fourth aspect of the invention and the overall configuration of a SVP of the fourth aspect of the invention.

In the conventional storage apparatus shown in (a) of FIG. 12, the mounting positions of the dual-configured SVPs 251a, 251b are set on the side face of the installed position of the HDD box 253 on the topmost portion within the storage apparatus 250. Within the storage apparatus 250, a logic box 255 is positioned below the HDD box 253; the power supply device 257 is positioned below the logic box 255; and the battery 259 is positioned below the power supply device 257, that is, in the lowermost portion of the storage apparatus 250.

On the other hand, the conventional SVP shown in (b) of FIG. 12 comprises, on a board 261, a CPU 263, power supply device 265 with fans 265a and 265b, HDD 267 with fan 267a, CD-ROM 269, and FDD 271.

As explained above, an HDD 267, CD-ROM 269, and FDD 271 are mounted in the conventional SVP, so that the hardware of the SVP as a whole is necessary large in size, and mounting positions are disadvantageous with respect to vibrations, electrical noise and similar, such as for example the topmost portion within the storage apparatus 250 or the side face of the installation position of the HDD box 253, as shown in (a) of FIG. 12. Moreover, locations are necessarily difficult to cool. Consequently the fans 265a, 265b, 267a and similar are provided, and the SVP itself must be cooled. In other words, the hardware of a conventional SVP is itself large, and in addition there are numerous operating components, so that the effects of vibrations, electrical noise and similar are difficult to avoid, and it is not possible to mount components within the logic box, which is more susceptible to the effect of cooling.

Hence in light of the above, the storage apparatus of a fourth aspect of the invention and an SVP, that is, a storage apparatus configured as in (a) of FIG. 13, and an SVP with the configuration shown in (b) of FIG. 13, are proposed.

In the storage apparatus of the fourth aspect of the invention shown in (a) of FIG. 13, the mounting positions of the dual-configured SVPs 281a and 281b are set within the logic box 285 substantially in the center within the storage apparatus 280. The HDD box 283 is positioned in the uppermost portion within the storage apparatus 280; the power supply device 287 is positioned below the logic box 285 within the storage apparatus 280; and the battery 289 is positioned below the power supply device 287, that is, in the lowermost portion of the storage apparatus 280.

On the other hand, the SVP of the fourth aspect of the invention shown in (b) of FIG. 13 is configured comprising, on a board 291, only the CPU 293 and DC-DC power supply 295. As shown in (b) of FIG. 13, the CD-ROM, HDD, and FDD are removed from the board 291, in a configuration comprising only the electrical components of the CPU 293 and DC-DC power supply 295. As is clear upon comparing (b) of FIG. 13 and (b) of FIG. 12, the SVP as a whole can be made small and the thickness can be reduced, so that SVP functions can be realized in a single package.

Further, the size of the SVP as a whole can be decreased to a scale at which the SVP can be accommodated within a standard logic board in the logic box 285, and the thickness can be decreased; hence in contrast with the conventional SVP shown in FIG. 12, there is no need to take measures with respect to vibrations, electrical noise, cooling, and similar.

Figure 14:
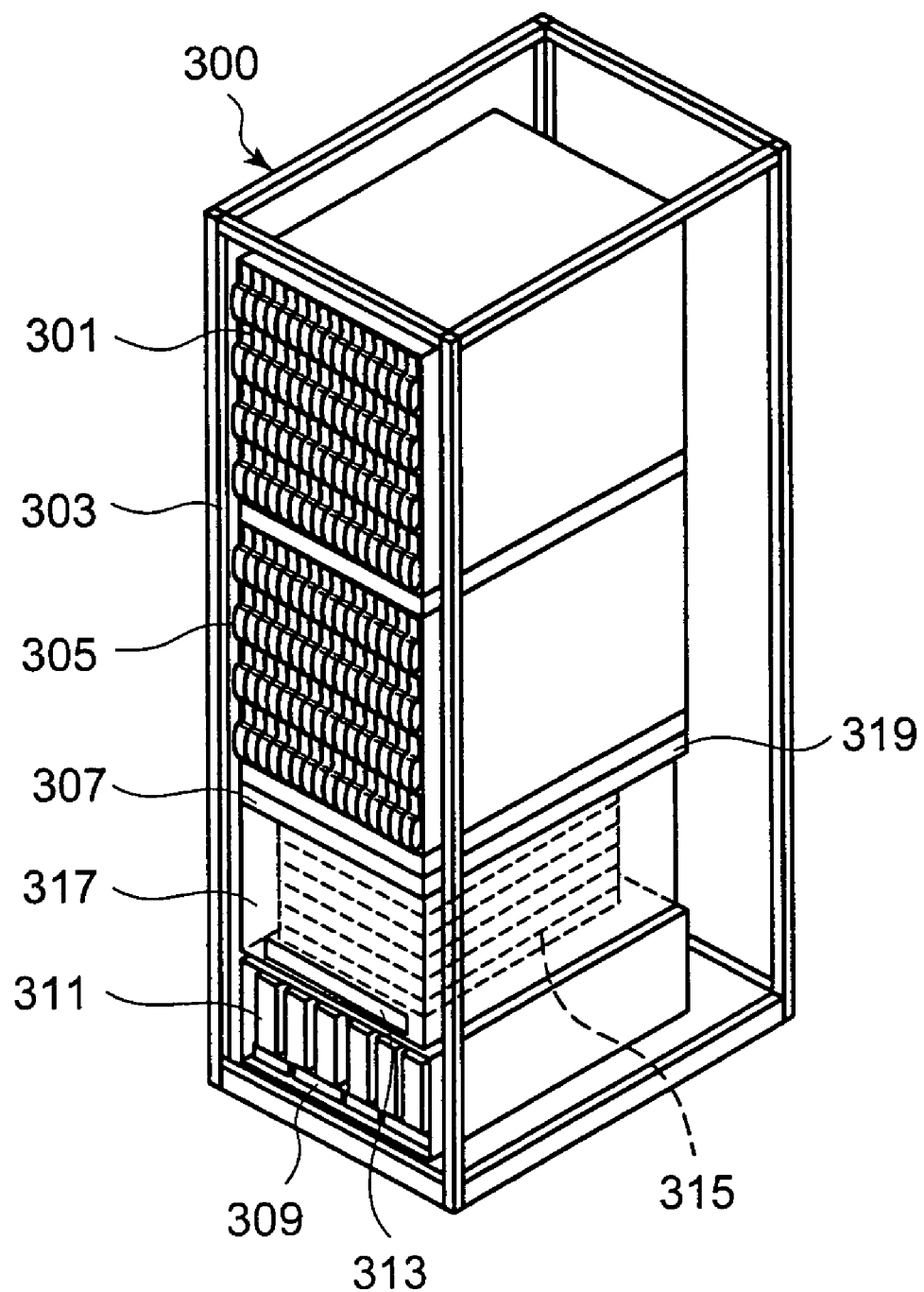
FIG. 14 is a perspective view showing the overall configuration of a storage apparatus of the prior art different from the storage apparatus of the prior art shown in FIG. 12; and, FIG. 15 is a perspective view showing the overall configuration of a storage apparatus of a fifth aspect of the invention.
Figure 15:
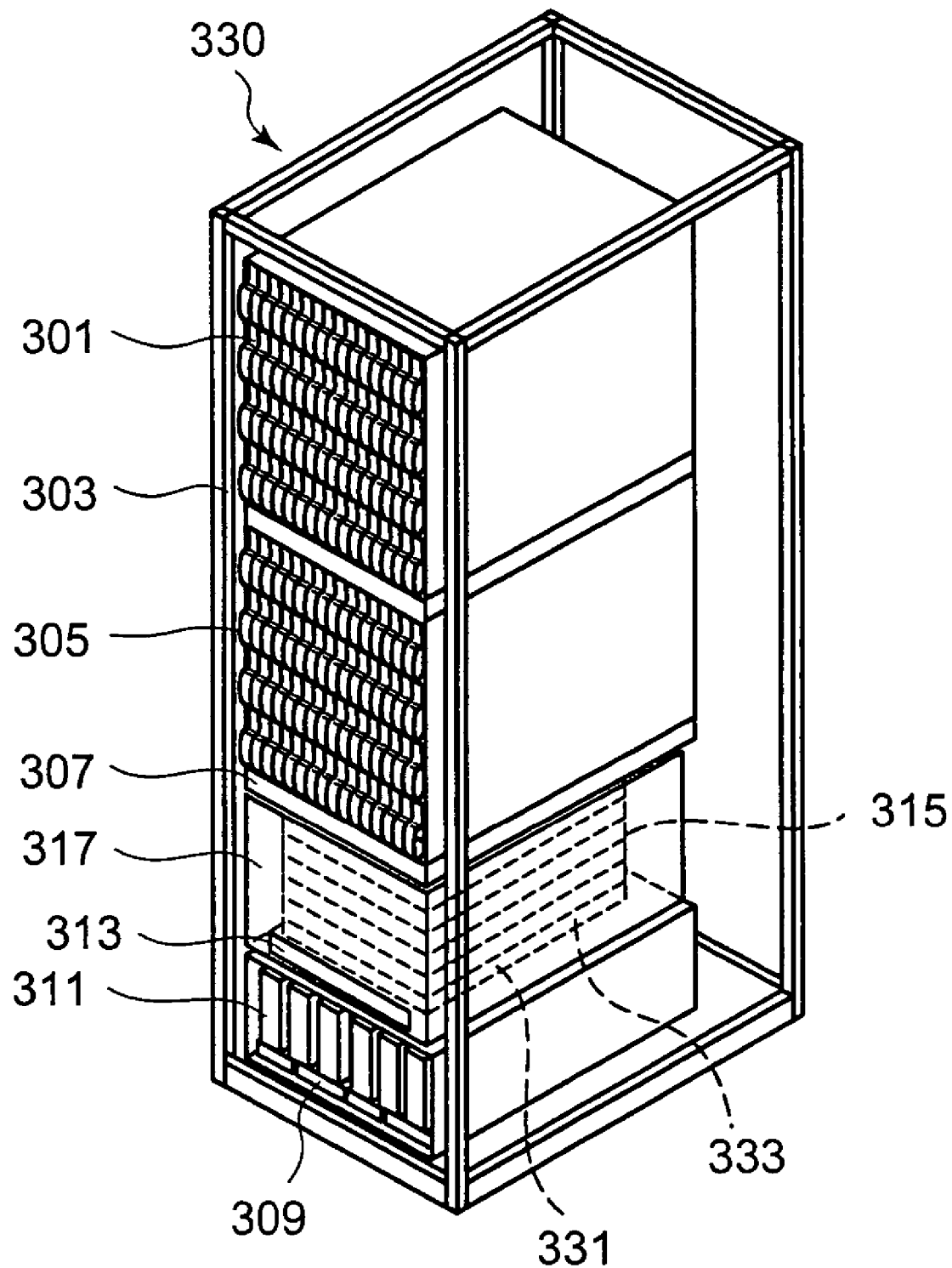

FIG. 14 is a perspective view showing the overall configuration of a storage apparatus of the prior art different from the storage apparatus of the prior art shown in FIG. 12. FIG. 15 is a perspective view showing the overall configuration of a storage apparatus of a fifth aspect of the invention.

In the other storage apparatus of the prior art shown in FIG. 14 are positioned, in order from the topmost portion toward the bottommost portion in the rack 300 of prescribed size, are position the first HDD box 301; first battery unit 303; and second HDD box 305; second battery unit 307. On the other hand, from the bottommost portion toward the topmost portion of the above rack 300 are positioned, in the order of the logic box unit 317, a plurality (in FIG. 14, 4) of AC boxes 309; a plurality (in FIG. 14, 6) of batteries 311; an OP panel 313; and a plurality of stacked logic boards 315. As indicated by the symbol 319, the SVP is mounted between the second battery unit 307 and the logic box unit 317, occupying one unit's worth of area in the rack 300. Of course when dually configured SVPs are used, two units' worth of area is occupied in the rack 300 by two SVPs.

On the other hand, in a storage apparatus of a fifth aspect of the invention, (because a dual configuration of SVPs is used) the two SVPs 331, 333, made small and thin enough to be accommodated within a standard board in a logic box, as explained in (b) of FIG. 13, are arranged together with a stack of a plurality of logic boards 315 and mounted within the logic box 317. In FIG. 15, the first HDD box, first battery unit, second HDD box, second battery unit, plurality of (in FIG. 15, 4) AC boxes, plurality of (in FIG. 15, 6) batteries, and OP panel, which are portions other than the in the above-described configuration, are assigned the same symbols as in FIG. 14, and detailed explanations are omitted.

By means of the above-described fifth aspect of the invention, the adverse effects of vibrations and electrical noise on the SVP can be reduced compared with the conventional storage apparatus shown in FIG. 14, and moreover no particular measures need be taken with respect to cooling or similar.

In the above, preferred aspects of the invention have been explained; but these are illustrations for use in explaining the invention, and the scope of the invention is not limited to these aspects. This invention can be executed in various other modes.

What is claimed is:

1. A storage system, comprising:
   a storage apparatus, which performs a communication over a communication network with a maintenance terminal;
   a first information processing terminal which performs necessary setting tasks, maintenance tasks, or management tasks on each portion of said storage apparatus and which monitors the states of each portion of said storage apparatus, and upon recognizing the occurrence of an event in said storage apparatus, notifies said maintenance terminal of the occurrence of the event;
   a second information processing terminal which monitors a state of said first information processing terminal;
   a plurality of hubs on communication paths between said first information processing terminal and said second information processing terminal; and
   a management table in each of said first information processing terminal and said second information processing terminal, which stores information indicating the results of communication tests performed with the other of said first information processing terminal and said second information processing terminal via a communication path;
   wherein each of said first information processing terminal and said second information processing terminal references information recorded in its management table, and based on said information, judges whether the state of the other information processing terminal is anomalous;
   wherein upon either of said first information processing terminal or said second information processing terminal judging the state of the other information processing terminal as anomalous, said judging terminal halts operation of said anomalous terminal, and said judging terminal performs tasks previously performed by said anomalous terminal;
   wherein each of said first and second information processing terminals has pattern information stored in said management tables;
   wherein said pattern information is obtained as a result of communication tests with the other of first and second information processing terminals;
   wherein said pattern information is used to detect the presence of a malfunction in the other information processing terminal, and the malfunction location;
   wherein said second information processing terminal monitors the states of said plurality of hubs;
   wherein each of said first information processing terminal and said second information processing terminal references information recorded in its management table, and based on said information, judges whether the state of a hub is anomalous; and
   wherein upon either of said first information processing terminal or said second information processing terminal judging the state of a hub as anomalous, said information processing terminal turns off the anomalous hub, and turns on another hub.

2. A storage system, comprising:
   a storage apparatus, which performs a communication over a communication network with a maintenance terminal;
   a first information processing terminal comprising said maintenance terminal, which performs necessary setting tasks, maintenance tasks, or management tasks on each portion of said storage apparatus;
   a plurality of second information processing terminals, which monitor the states of each portion of said storage apparatus, and upon recognizing the occurrence of an event in said storage apparatus, notify said maintenance terminal of the occurrence of the event; and
   a plurality of hubs on communication paths between said second information processing terminals;
   wherein said second information processing terminals comprise at least two information processing terminals, one of which is an information processing terminal in an operating state, and another of which is an information processing terminal in a standby state;

wherein each of said second information processing terminals comprises a state monitoring portion which monitors a state of another second information processing terminal through mutual communication;

wherein each of said state monitoring portions has a management table in which is recorded information indicating the results of communication tests performed with the another second information processing terminal;

wherein each of said state monitoring portions references information recorded in said management table to judge whether the state of the another second information processing terminal is anomalous;

wherein upon judging as anomalous the state of said second information processing terminal in the operating state, the state monitoring portion of said second information processing terminal in the standby state causes operation of said second information processing terminal in the operating state to be halted, and causes operation of said second information processing terminal in the standby state;

wherein each of said second information processing terminals has pattern information stored in said management tables, wherein said pattern information is obtained as a result of communication tests with the other second information processing terminal;

wherein said pattern information is used to detect the presence of a malfunction in another second information processing terminal, and the malfunction location;

wherein said second information processing terminals monitor the states of said plurality of hubs;

wherein each of said second information processing terminals reference information recorded in its management table, and based on said information, judges whether the state of a hub is anomalous; and wherein upon any of said second information processing terminals judging the state of a hub as anomalous, said second information processing terminal turns off the anomalous hub, and turns on another hub.

* * * * *